United States Patent
Nagakura et al.

(10) Patent No.: US 9,222,202 B2
(45) Date of Patent: Dec. 29, 2015

(54) CARBON FIBER BUNDLE, METHOD FOR PRODUCING THE SAME, AND MOLDED ARTICLE MADE THEREOF

(71) Applicant: Teijin Limited, Osaka-shi, Osaka (JP)

(72) Inventors: Kaori Nagakura, Shizuoka (JP); Takeshi Naito, Shizuoka (JP); Masaru Sato, Shizuoka (JP); Toru Kaneko, Shizuoka (JP); Katsuyuki Hagihara, Shizuoka (JP); Takashi Ito, Shizuoka (JP); Jirou Sadanobu, Shizuoka (JP)

(73) Assignee: Teijin Limited, Osaka-shi, Osaka (JP)

( * ) Notice: Subject to any disclaimer, the term of this patent is extended or adjusted under 35 U.S.C. 154(b) by 437 days.

(21) Appl. No.: 13/737,509

(22) Filed: Jan. 9, 2013

(65) Prior Publication Data

US 2013/0122262 A1 May 16, 2013

Related U.S. Application Data

(63) Continuation of application No. PCT/JP2011/066175, filed on Jul. 11, 2011.

(30) Foreign Application Priority Data

Jul. 13, 2010 (JP) .................................. 2010-158802
Jul. 23, 2010 (JP) .................................. 2010-166340

(51) Int. Cl.
*D02G 3/36* (2006.01)
*D06M 15/227* (2006.01)
(Continued)

(52) U.S. Cl.
CPC ................. *D02G 3/36* (2013.01); *B29C 70/085* (2013.01); *B29C 70/345* (2013.01); *B32B 5/022* (2013.01);
(Continued)

(58) Field of Classification Search
CPC .... B32B 5/022; B32B 5/26; C09D 123/0838; D04H 1/732; D04H 1/00; D06N 3/045; D06N 3/0011; D02G 3/36; D02G 3/02; D06M 15/227; D06M 15/233; D06M 15/263; D06M 2101/40; D06M 2200/35; B29C 70/345; B29C 70/085; C08J 5/042; C08J 5/06; C08J 5/24; C08J 2323/12; Y10T 428/2918; Y10T 428/24628; Y10T 428/24612; Y10T 428/249944; Y10T 442/605; Y10T 442/2984

See application file for complete search history.

(56) References Cited

U.S. PATENT DOCUMENTS 4,000,111 A * 12/1976 Henman et al. ................ 523/213
4,474,906 A 10/1984 Nakama et al.
(Continued)

FOREIGN PATENT DOCUMENTS

CN 101163828 A 4/2008
JP 58-126375 7/1983
(Continued)

OTHER PUBLICATIONS

English translation of JP 2005-2261393 A (Nakamura et al.), published Aug. 25, 2005, obtained from Japanese Patent Office website.*
(Continued)

*Primary Examiner* — Jeremy R Pierce
(74) *Attorney, Agent, or Firm* — Banner & Witcoff, Ltd.

(57) ABSTRACT

A carbon fiber bundle includes carbon fibers and a copolymerized polyolefin attached to the surface of the carbon fibers. The copolymerized polyolefin contains an aromatic vinyl compound and an acid and/or acid anhydride as copolymerization components. The amount of the copolymerized polyolefin attached is 0.01 to 10 parts by mass per 100 parts by mass of the carbon fiber bundle. The carbon fiber bundle may be used or contained in a random mat, a composite material, and various molded articles.

20 Claims, 7 Drawing Sheets

(51) Int. Cl.
- *B32B 5/02* (2006.01)
- *B32B 5/26* (2006.01)
- *D02G 3/02* (2006.01)
- *D04H 1/00* (2006.01)
- *D04H 1/732* (2012.01)
- *D06N 3/00* (2006.01)
- *D06N 3/04* (2006.01)
- *D06M 15/233* (2006.01)
- *D06M 15/263* (2006.01)
- *B29C 70/34* (2006.01)
- *B29C 70/08* (2006.01)
- *C08J 5/04* (2006.01)
- *C08J 5/06* (2006.01)
- *C08J 5/24* (2006.01)
- *D06M 101/40* (2006.01)

(52) U.S. Cl.
CPC . *B32B 5/26* (2013.01); *C08J 5/042* (2013.01); *C08J 5/06* (2013.01); *C08J 5/24* (2013.01); *D02G 3/02* (2013.01); *D04H 1/00* (2013.01); *D04H 1/732* (2013.01); *D06M 15/227* (2013.01); *D06M 15/233* (2013.01); *D06M 15/263* (2013.01); *D06N 3/0011* (2013.01); *D06N 3/045* (2013.01); *C08J 2323/12* (2013.01); *D06M 2101/40* (2013.01); *D06M 2200/35* (2013.01); *Y10T 428/24612* (2015.01); *Y10T 428/24628* (2015.01); *Y10T 428/249944* (2015.04); *Y10T 428/2918* (2015.01); *Y10T 442/2984* (2015.04); *Y10T 442/605* (2015.04)

(56) References Cited

U.S. PATENT DOCUMENTS

| | | | |
|---|---|---|---|
| 5,560,985 A | | 10/1996 | Watanabe et al. |
| 5,667,857 A | | 9/1997 | Watanabe et al. |
| 2001/0053450 A1 | | 12/2001 | Yeager et al. |
| 2001/0053820 A1 | | 12/2001 | Yeager et al. |
| 2002/0028337 A1 | | 3/2002 | Yeager et al. |
| 2002/0169256 A1 | | 11/2002 | Merfeld |
| 2002/0177027 A1 | | 11/2002 | Yeager et al. |
| 2003/0096123 A1 | | 5/2003 | Yeager |
| 2004/0009338 A1* | | 1/2004 | Jo et al. ............. 428/297.4 |
| 2004/0106750 A1 | | 6/2004 | Yeager et al. |
| 2005/0014906 A1 | | 1/2005 | Niino |
| 2005/0109990 A1 | | 5/2005 | Yeager et al. |
| 2007/0191577 A1 | | 8/2007 | Yeager et al. |
| 2009/0061193 A1 | | 3/2009 | Hara et al. |
| 2010/0136332 A1 | | 6/2010 | Murayama et al. |
| 2011/0263778 A1 | | 10/2011 | Honma et al. |
| 2012/0015186 A1 | | 1/2012 | Honma et al. |

FOREIGN PATENT DOCUMENTS

| | | | |
|---|---|---|---|
| JP | 02-084566 | | 3/1990 |
| JP | 05-147146 | | 6/1993 |
| JP | 05147034 A | * | 6/1993 |
| JP | 06-107442 | | 4/1994 |
| JP | 07-197381 | | 1/1995 |
| JP | 2003-253563 | | 9/2003 |
| JP | 2004-156014 | | 6/2004 |
| JP | 2004-176227 | | 6/2004 |
| JP | 2005-226193 | | 8/2005 |
| JP | 2006-051813 | | 2/2006 |
| JP | 2006-124847 | | 5/2006 |
| JP | 2007-133246 | | 5/2007 |
| JP | 2008-231640 | | 10/2008 |
| JP | 2009-197359 | | 3/2009 |
| JP | 2010-149353 | | 7/2010 |
| WO | WO 9829242 A1 | * | 7/1998 |
| WO | 2010074120 A1 | | 7/2010 |
| WO | 2012-008561 | | 1/2012 |

OTHER PUBLICATIONS

English abstract of JP 5-147034 A (Inoue et al.), published Jun. 1993, obtained from Derwent.*

Partial certified English translation to JP 2005-226193 A to Nakamura et al., published on Aug. 25, 2005.*

Certified English translation to JP 2010-149353 A to Honma et al., published on Jul. 8, 2010.*

Certified English translation to JP 02-084566 A to Inoue et al., published on Mar. 26, 1990.*

International Search Report for International Application No. PCT/JP2011066175 mailed Sep. 6, 2011.

Partial English Translation PCT/IPEA/409 mailed Jul. 13, 2010.

Partial English Translation PCT/ISA/237 mailed Sep. 6, 2011.

* cited by examiner

FIG. 5B    FIG. 5A
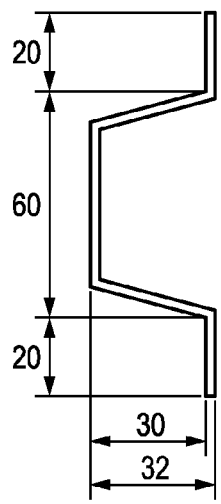
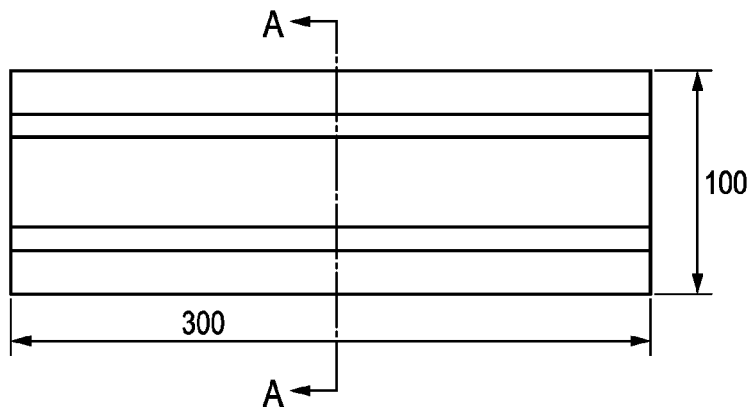
FIG. 6A
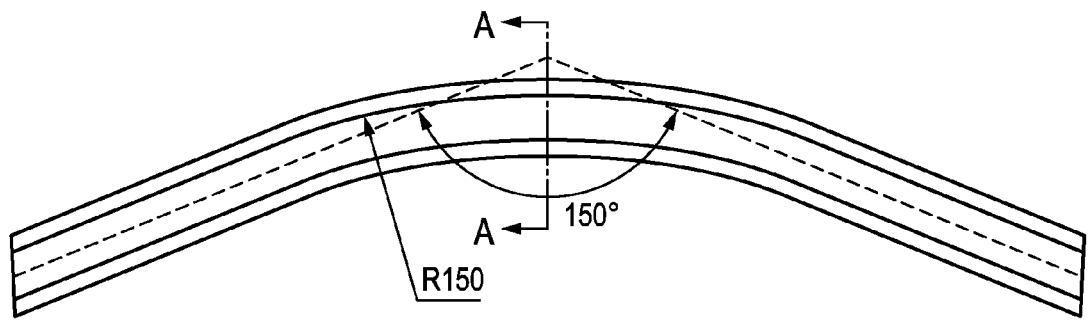
FIG. 6B
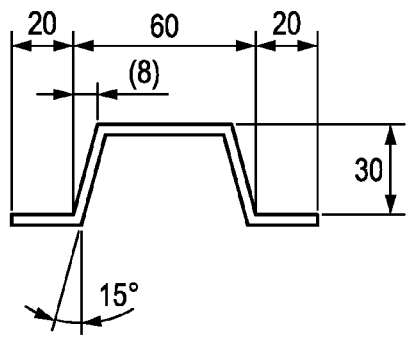

500

US 9,222,202 B2

CARBON FIBER BUNDLE, METHOD FOR PRODUCING THE SAME, AND MOLDED ARTICLE MADE THEREOF

This application is a continuation of International Application No. PCT/JP2011/066175 filed on Jul. 11, 2011, which is based on and claim priority to Japanese Patent Application No. 2010-158802 filed on Jul. 13, 2010 and Japanese Patent Application No. 2010-166340 filed on Jul. 23, 2010, the contents of which are incorporated herein by reference.

TECHNICAL FIELD

The present invention relates to a carbon fiber bundle having applied thereto a polyolefin that functions as a sizing agent having excellent adhesion to a thermoplastic resin matrix such as a polypropylene resin, and also to a method for producing the carbon fiber bundle. The invention also relates to a random mat, a composite material, and various molded articles containing the carbon fiber bundle.

BACKGROUND ART

A carbon fiber is made of a large number of ultra-fine filaments. It has low elongation and is prone to fluffing due to mechanical friction, etc. Therefore, in order to increase the bundling properties of carbon fibers to improve handleability and also increase compatibility with the matrix, a sizing agent is commonly applied to carbon fibers.

A large number of proposals have been made regarding sizing agents for carbon fibers. For example, Patent Document proposes polyurethane-coated carbon fibers and a carbon-fiber-reinforced thermoplastic resin composition made of the carbon fibers and a thermoplastic resin. It is disclosed that this proposal makes it possible to improve the handleability of the carbon fibers and also improve the mechanical characteristics of the carbon-fiber-reinforced thermoplastic resin.

Meanwhile, Patent Document 2 proposes a sizing agent containing as essential components a bisphenol-A epoxy resin that is liquid at normal temperature, a bisphenol-A epoxy resin that is solid at normal temperature, an unsaturated polyester resin, and stearic acid. Patent Document 2 further discloses that the sizing agent imparts excellent abrasion resistance to a carbon fiber strand.

However, the sizing agents for carbon fibers disclosed in Patent Documents 1 and 2 are aimed to improve the adhesion of carbon fibers with a thermosetting resin such as an epoxy resin or with a highly polar thermoplastic resin such as polycarbonate or polyamide. Even when carbon fibers having applied thereto such a conventional sizing agent are applied to polypropylene, the strength of the resulting carbon fiber-polypropylene composite material is hardly improved.

Meanwhile, regarding sizing agents for glass fibers, some sizing agents that improve the adhesion between reinforcing fibers (glass fibers) and polypropylene have been proposed. For example, Patent Document 3 proposes a sizing agent for glass fibers, which contains an acid-modified olefin resin and an amino-group-containing silane coupling agent. Patent Document 3 further discloses that the olefin resin, which is a matrix resin, firmly adheres to glass fibers, whereby fluffing does not occur in the raw material or molded articles, and the resulting molded articles have excellent strength.

However, even when the sizing agent disclosed in Patent Document 3 is applied to carbon fibers, carbon fibers are different from glass fibers, so the adhesion-improving effect of a silane coupling agent cannot be expected. In addition, although carbon fibers are stronger than glass fibers, their reactivity with a sizing agent is poor. Accordingly, the mechanical characteristics of a carbon fiber-polypropylene composite material cannot sufficiently reflect the high performance of carbon fibers.

In addition, Patent Document 4 proposes a sizing agent for inorganic fibers made of an aqueous emulsion containing as an essential component a modified polypropylene resin having an intrinsic viscosity [η] of 0.02 to 1.3 dl/g modified with 1 to 20 mass % an unsaturated dicarboxylic acid, or a salt thereof. Patent Document 4 describes that use of this sizing agent makes it possible to improve the mechanical characteristics of a glass-fiber-reinforced polypropylene resin.

Also regarding sizing agents for carbon fibers, some techniques for improving the adhesion between reinforcing fibers (carbon fibers) and polypropylene have been proposed. For example, Patent Document 5 discloses that an aqueous emulsion, suspension, or organic solvent solution containing a modified polyolefin is applied to unsized carbon fibers, followed by a heat treatment at 120 to 250° C. to apply the modified polyolefin resin to the surface of the carbon fibers.

In addition, Patent Document 6 discloses that a copolymerized emulsion is used in an amount of 5 to 200 parts by weight per 100 parts by weight of carbon fibers. The copolymerized emulsion is obtained by the emulsion polymerization of monomers including an aromatic vinyl monomer: 40 to 98.5 wt %, an ethylenic unsaturated carboxylic acid monomer: 0.5 to 10 wt %, a vinyl cyanide monomer and/or an unsaturated carboxylic acid alkyl ester monomer: 1 to 40 wt %, and an additional monomer copolymerizable with them: 0 to 10 wt %.

However, the substantial disclosure of Patent Document 6 is a copolymerized emulsion containing a high proportion (77 to 88 wt %) of an aromatic vinyl monomer. In addition, Patent Document 7 discloses reinforcing fibers having attached thereto a copolymer (B) in an amount of 0.01 to 30 parts by weight per 100 parts by weight of reinforcing fibers. The copolymer (B) includes (a) an aromatic vinyl monomer unit: 10 to 50 wt %, (b) a (meta)acrylic ester monomer unit: 50 to 90 wt %, and (c) an additional vinyl monomer unit copolymerizable with (a) and (b): 0 to 30 wt %.

The substantial disclosure of Patent Document 7 is only a copolymer containing a combination of an aromatic vinyl monomer and a (meta)acrylic ester monomer.

Against these techniques, there has been a demand for the development of a sizing agent composition capable of further enhancing adhesion and compatibility with a thermoplastic resin, such as a polypropylene resin, and also of providing a carbon fiber bundle that has excellent handleability and bundling properties and is less prone to fluffing.
(Patent Document 1) JP-A-58-126375
(Patent Document 2) JP-A-7-197381
(Patent Document 3) JP-A-2003-253563
(Patent Document 4) JP-B-6-96463
(Patent Document 5) JP-A-2006-124847
(Patent Document 6) JP-A-2004-176227
(Patent Document 7) JP-A-2009-197359

DISCLOSURE OF THE INVENTION

Problems that the Invention is to Solve

The invention has been accomplished in view of the problems of the prior art mentioned above and provides a carbon fiber bundle having excellent adhesion to a thermoplastic resin such as a polypropylene resin and a method for producing the same. The invention also relates to a random mat, a composite material, and various molded articles containing the carbon fiber bundle.

Means for Solving the Problems

The invention that achieves the above object is a carbon fiber bundle including carbon fibers and a copolymerized polyolefin attached to the surface of the carbon fibers, the copolymerized polyolefin containing an aromatic vinyl compound and an acid and/or acid anhydride as copolymerization components. The copolymerized polyolefin is obtainable by the graft copolymerization of at least one member selected from the group consisting of propylene-aromatic vinyl compound copolymers and propylene-α-olefin-aromatic vinyl compound copolymers with at least one member selected from the group consisting of unsaturated dicarboxylic acids and acid anhydrides thereof. The copolymerization ratio between the olefin and the aromatic vinyl compound in the copolymerized polyolefin is such that the molar ratio of the aromatic vinyl compound is 0.1 to 5 per 100 of the olefin. The amount of the copolymerized polyolefin attached is 0.01 to 10 parts by mass per 100 parts by mass of the carbon fiber bundle. The invention also provides a random mat, a composite material, and various molded articles containing the carbon fiber bundle.

Advantage of the Invention

According to the invention, a carbon fiber bundle that has significantly improved adhesion and compatibility with a thermoplastic resin such as a polypropylene resin, and that has excellent handleability and bundling properties and is less prone to fluffing can be provided. Thus, a composite material containing a thermoplastic resin, such as a polypropylene resin, and a carbon fiber bundle is advantageously obtained.

BRIEF DESCRIPTION OF THE DRAWINGS

FIG. 5A shows a schematic diagram of a mold used in Example 18 and FIG. 5B shows a cross-section A-A in FIG. 5A.
FIG. 6A shows a schematic diagram of a mold used in Example 19 and FIG. 6B shows a cross-section A-A in FIG. 6A.
FIG. 7A shows a cross-section A-A in FIG. 7B.

MODE FOR CARRYING OUT THE INVENTION

Figure 1:
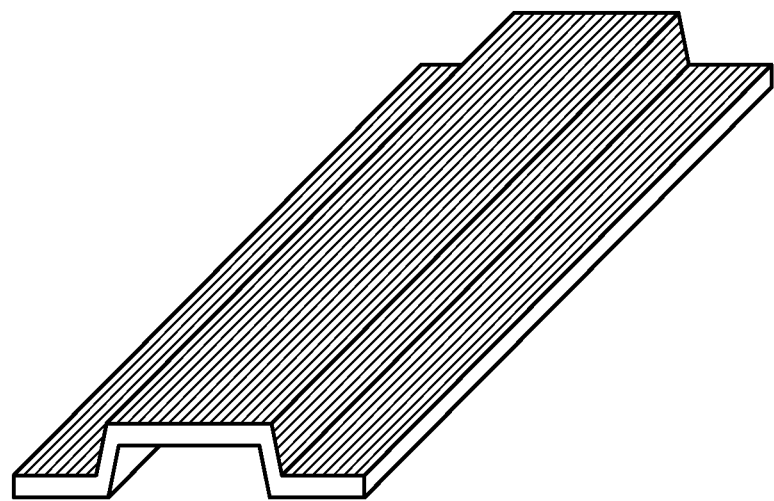
FIG. 1 shows an example of the structure of a composite molded part.

Hereinafter, embodiments of the invention will be described one by one.

In the copolymerized polyolefin forming the carbon fiber bundle of the invention, specifically, an aliphatic polyolefin is contained as a main component, and an aromatic vinyl compound and an acid and/or acid anhydride are contained as copolymerization components. The copolymerized polyolefin functions mainly as a sizing agent. When applied to a carbon fiber bundle, the copolymerized polyolefin enhances the adhesion between the carbon fiber bundle and a resin, and also enhances the bundling properties of the carbon fiber bundle, suppressing the fluffing of the carbon fibers.

The copolymerized polyolefin has high adhesion to carbon fibers and thus also functions as a matrix resin for a composite material.

The copolymerized polyolefin containing an aromatic vinyl compound and an acid and/or acid anhydride as copolymerization components is at least one member selected from the group consisting of propylene-aromatic vinyl compound-acid and/or acid anhydride copolymers, propylene-α-olefin-aromatic vinyl compound-acid and/or acid anhydride copolymers, ethylene-aromatic vinyl compound-acid and/or acid anhydride copolymers, ethylene-α-olefin-aromatic vinyl compound-acid and/or acid anhydride copolymers, 1-butene-aromatic vinyl compound-acid and/or acid anhydride copolymers, and 1-butene-α-olefin-aromatic vinyl compound-acid and/or acid anhydride copolymers.

Here, a propylene-α-olefin-aromatic vinyl compound-acid and/or acid anhydride copolymer is obtained by the copolymerization of propylene as a main component with an α-olefin, an aromatic vinyl compound, and an acid and/or acid anhydride.

Examples of α-olefins include $C_2$ and $C_{4-20}$ α-olefins such as ethylene, 1-butene, 1-pentene, 1-hexene, 1-heptene, 1-octene, and 4-methyl-1-pentene.

It is preferable that the aromatic vinyl compound used in the invention is represented by the following equation (1):

$$ArCH=CH_2 \tag{1}$$

wherein Ar is a $C_{6-15}$ aromatic group.

Examples of $C_{6-15}$ aromatic groups include aryl groups such as a phenyl group, a naphthyl group, a biphenylyl group, and a phenanthryl group; alkylaryl groups such as a methylphenyl group, a dimethylphenyl group, and methylnaphthyl; alkoxyaryl groups such as a methoxyphenyl group and a butoxyphenyl group; silyloxy phenyl groups such as a trimethylsilyloxy phenyl group; and halogenated phenyl groups such as a bromophenyl group, a chlorophenyl group, and a fluorophenyl group.

Specific examples of aromatic vinyl compounds include styrenes such as styrene, methylstyrene, methoxystyrene, butoxystyrene, trimethylsilyloxy styrene, divinylbenzene, and chlorostyrene, vinylnaphthalene, vinylbiphenyl, and vinylphenanthrene. Among them, styrene, methylstyrene, and vinylnaphthalene are particularly preferable.

The copolymerization ratio between the olefin and the aromatic vinyl compound in the copolymerized polyolefin is such that the molar ratio of the aromatic vinyl compound is 0.1 to 10 per 100 of the olefin. When the molar ratio is less than 0.1, the adhesion between the carbon fiber bundle and a polypropylene resin tends to decrease. In addition, when the molar ratio is more than 10, the relative polyolefin content of the copolymerized polyolefin decreases, whereby the adhesion between the carbon fibers and a polypropylene resin may decrease. It is more preferable that the molar ratio of the aromatic vinyl compound is 1 to 5 per 100 of the olefin.

It is preferable that the olefin is propylene and/or a propylene-$\alpha$-olefin copolymer. Here, the copolymerization ratio between propylene and the $\alpha$-olefin is not particularly limited. However, it is preferable that the molar ratio of the $\alpha$-olefin is 2 to 200 per 100 of propylene, and it is more preferable that the molar ratio of the $\alpha$-olefin is 10 to 150 per 100 of propylene. It is still more preferable that the molar ratio of the $\alpha$-olefin is 20 to 100 per 100 of propylene. An increase in the amount of the propylene component present tends to increase adhesion to a substrate made of a thermoplastic resin such as a polypropylene resin.

It is preferable that the copolymerization ratio of the acid and/or acid anhydride in the copolymerized polyolefin is such that the molar ratio of the acid and/or acid anhydride is 0.01 to 50 per 100 of the olefin. When the molar ratio is less than 0.01, the adhesion between the carbon fiber bundle and a polypropylene resin tends to decrease. In addition, when the molar ratio is more than 50, the relative polyolefin content of the copolymerized polyolefin decreases, whereby the adhesion between the carbon fibers and a polypropylene resin may decrease. It is more preferable that the molar ratio of the acid and/or acid anhydrides is 0.1 to 20 per 100 of the olefin.

It is preferable that the acid and/or acid anhydride used in the invention is at least one member selected from the group consisting of carboxylic acids and acid anhydrides thereof. Examples of carboxylic acids include unsaturated dicarboxylic acids such as maleic acid, fumaric acid, citraconic acid, and mesaconic acid, and examples of acid anhydrides thereof include maleic anhydride, itaconic anhydride, and citraconic anhydride. Among them, maleic anhydride and itaconic anhydride are preferable.

As acid and/or acid anhydride modification, specifically, it is preferable that a copolymer of an olefin and an aromatic vinyl compound is further graft-copolymerized with a component having an organic acid group such as a carboxyl group. In particular, it is preferable that a copolymer of an olefin and an aromatic vinyl compound is graft-copolymerized with at least one member selected from the group consisting of unsaturated dicarboxylic acids and acid anhydrides thereof.

That is, it is preferable that the copolymerized polyolefin containing an aromatic vinyl compound and an acid and/or acid anhydride as copolymerization components of the invention is a compound obtained by graft-copolymerizing a propylene-aromatic vinyl compound copolymer and a propylene-$\alpha$-olefin-aromatic vinyl compound copolymer with at least one member selected from the group consisting of unsaturated dicarboxylic acids and acid anhydrides thereof.

Further, it is preferable that the copolymerization ratio between the olefin and the acid and/or acid anhydride in the copolymerized polyolefin obtained by graft copolymerization is such that the molar ratio of the acid and/or acid anhydride is 0.01 to 5, more preferably 0.1 to 2, per 100 of the olefin.

When the grafting amount is less than the above range, the adhesion between the carbon fiber bundle and a thermoplastic resin such as a polypropylene resin tends to decrease. Meanwhile, when the grafting amount is too large, the relative polyolefin content of the copolymerized polyolefin decreases, whereby the adhesion between the carbon fibers and a thermoplastic resin such as a polypropylene resin may decrease.

It is preferable that the copolymerized polyolefin has a weight average molecular weight of 35,000 to 100,000. When the weight average molecular weight is less than 35,000, this may result in poor adhesion between the carbon fiber bundle and a thermoplastic resin such as a polypropylene resin, while when it is more than 100,000, emulsification may be difficult. In addition, even when emulsification can be performed, the resulting emulsion may have a large particle size and be unstable, making long-term operation difficult. In addition, as a method for measuring weight average molecular weight, it is possible to use a known method, such as a high-temperature GPC method.

In the carbon fiber bundle of the invention, the amount of the copolymerized polyolefin attached is 0.01 to 10 parts by mass per 100 parts by mass of the carbon fiber bundle. The amount of the copolymerized polyolefin attached to the carbon fiber bundle in the invention depends on the molding method or the intended use, but is preferably 0.2 to 5 parts by mass per 100 parts by mass of the carbon fiber bundle. When the amount of the copolymerized polyolefin attached is less than 0.01 parts by mass, this results in poor handleability during molding. Meanwhile, when it is more than 10 parts by mass, the amount of the copolymerized polyolefin is large relative to the matrix resin. As a result, the crystallinity of the matrix resin is reduced, deteriorating the mechanical characteristics of the composite material. Therefore, this is undesirable.

<Method for Producing Carbon Fiber Bundle>

The carbon fiber bundle of the invention is preferably produced by applying a copolymerized polyolefin containing an aromatic vinyl compound and an acid and/or acid anhydride as copolymerization components to the surface of carbon fibers in an amount of 0.01 to 10 parts by mass per 100 parts by mass of the carbon fiber bundle, followed by a heat treatment.

In the invention, the copolymerized polyolefin can be used in the form of an aqueous emulsion or a solution using a solvent capable of dissolving the copolymerized polyolefin. However, in the invention, it is preferable that the copolymerized polyolefin is used in the form of an aqueous emulsion. In the case of an aqueous emulsion, it is preferable that the amount of water is 2,000 to 10,000 parts by mass per 100 parts by mass of the copolymerized polyolefin. The aqueous emulsion is preferably obtained by a method in which, for example, the copolymerized polyolefin is dissolved in a solvent such as toluene or xylene, a surfactant is added as required to increase dispersibility, then a basic substance is added, and water is added in small portions to cause phase inversion emulsification.

That is, in order to obtain the carbon fiber bundle of the invention, in the case where the copolymerized polyolefin is used in the form of an aqueous emulsion, it is preferable to use a surfactant to achieve excellent dispersibility. Surfactants are not particularly limited, and known surfactants can be used as long as the object of the invention is not impaired. The amount of the surfactant used is preferably 1 to 30 parts by mass per 100 parts by mass of the copolymerized polyolefin. When the amount is 1 part by mass or more, the resin is dispersed even better than in the case where the amount is less than 1 part by weight, resulting in even better tensile shear characteristics with the carbon fiber bundle. Meanwhile, when the amount is more than 30 parts by mass, the water resistance of the copolymerized polyolefin may deteriorate, or the tensile shear characteristics with the carbon fiber bundle may deteriorate.

Examples of surfactants include, but are not particularly limited to, nonionic surfactants, anionic surfactants, cationic surfactants, and amphoteric surfactants. Among them, in terms of the particle size of the dispersed particles, it is preferable to use a nonionic surfactant or an anionic surfactant, and a nonionic surfactant is more preferable. As a nonionic surfactant, a polyoxyalkylene alkyl ether of the following equation (2) is mentioned, for example.

$$H_{2m2+1}C_{m2}-O-(X^2-O)_{n2}-H \quad (2)$$

(m2=an integer of 8 to 22, n2=an integer of 2 to 20, $X^2$: a $C_{1-5}$ alkylene group)

It is preferable that the number of carbon atoms in $X^2$ is 2 to 5. Examples of polyoxyethylene alkyl ethers include polyoxyethylene lauryl ether, polyoxyethylene cetyl ether, and polyoxyethylene oleyl ether. These compounds may be used alone, and it is also possible to use a mixture of two or more kinds.

As a method for attaching the copolymerized polyolefin to the surface of carbon fibers to obtain a carbon fiber bundle, a method in which the copolymerized polyolefin is attached in the form of an aqueous emulsion or a solution is mentioned. That is, examples of sizing methods include a spraying method, a roller immersion method, and a roller transfer method. Among these sizing methods, a roller immersion method provides excellent productivity and uniformity and thus is preferable. When a carbon fiber strand is immersed in an aqueous emulsion or a solution, it is important that through an immersion roller provided in the emulsion bath, opening and squeezing are repeated so that even the inside of the strand is impregnated with the copolymerized polyolefin liquid.

After the copolymerized polyolefin in the form of an aqueous emulsion or a solution is attached to an unsized carbon fiber bundle, the moisture or solvent is removed by the subsequent drying treatment, whereby desired carbon fibers having applied thereto the copolymerized polyolefin can be obtained. The amount of the copolymerized polyolefin attached to the carbon fibers is adjusted by adjusting the concentration of the copolymerized polyolefin, adjusting the squeezing roller, etc. For drying the carbon fibers, it is possible to use hot air, a hot plate, a roller, an infrared heater, and the like, for example.

It is preferable that the drying treatment is a heat treatment. By the heat treatment, in addition to the removal of the moisture or solvent, it is also possible to uniformly apply the copolymerized polyolefin to the surface of carbon fibers.

In the heat treatment step, it is preferable that the treatment is performed at 80° C. to 160° C. for 30 seconds or more. In the case of an aqueous emulsion, specifically, moisture is removed at 80° C., and then a heat treatment is performed at a temperature that is higher than the melting point of the copolymerized polyolefin, for example, 150° C., thereby forming a uniform film. When the temperature is less than 80° C., it takes time to remove moisture from the carbon fiber bundle, while when the temperature is more than 160° C. and the heat treatment is continued for a long period of time, the copolymerized polyolefin used in the invention undergoes thermal degradation, decreasing the effect of the invention.

<Carbon Fibers>

The carbon fibers forming the carbon fiber bundle of the invention may be any of polyacrylonitrile (PAN)-based carbon fibers, petroleum/coal pitch-based carbon fibers, rayon-based carbon fibers, lignin-based carbon fibers, and the like. In particular, PAN-based carbon fibers obtained from PAN as a raw material have excellent industrial-scale productivity and mechanical characteristics and thus are preferable.

It is possible to use PAN-based carbon fibers having an average diameter of 5 to 10 μm. It is possible to use PAN-based carbon fibers in the form of a fiber bundle of 1,000 to 50,000 single fibers.

In order to enhance the adhesion between the carbon fibers and a matrix resin, it is also preferable to use carbon fibers having an oxygen-containing functional group introduced into the surface thereof by a surface treatment.

<Carbon Fiber Bundle>

By applying the copolymerized polyolefin to carbon fibers to form the carbon fiber bundle of the invention, the handleability and bundling properties of the carbon fiber bundle can be improved, and the adhesion and compatibility between the carbon fibers and a matrix resin can also be improved. The handleability of carbon fibers can be evaluated based on the amount of fluff due to abrasion after abrasion with stainless steel.

<Composite Material>

The carbon fiber bundle of the invention has excellent adhesion and compatibility with a thermoplastic resin such as a polypropylene resin. Therefore, using the carbon fiber bundle of the invention, a composite material containing a thermoplastic resin, such as a polypropylene resin, and the carbon fiber bundle is advantageously obtained.

The adhesion between the carbon fiber bundle and a thermoplastic resin can be evaluated based on shear strength. For example, in accordance with JIS K 6850, a polypropylene film is placed between two carbon fiber bundles in such a manner that the length of the adhesive portion is 25 mm, followed by adhesive at 230° C. Subsequently, a test piece is held by the upper and lower chucks of the tester at the positions 50 mm away from both ends of the adhesive portion, respectively, and thus symmetrically fixed to the tester, and a tensile shear test is performed at a test speed of 3 mm/min. Adhesion can thus be evaluated. It can be confirmed that the carbon fiber bundle of the invention provides sufficient shear strength comparable to that of an epoxy-resin-based adhesive.

<Random Mat>

A random mat can be formed from discontinuous carbon fibers obtained by cutting the carbon fiber bundle of the invention to a fiber length of 2 to 60 mm. That is, the invention encompasses a random mat including the carbon fiber bundle mentioned above provided with a fiber length of 2 to mm, characterized in that the carbon fibers are substantially randomly oriented in the plane at an areal weight of 25 to 3,000 g/m².

The random mat is preferably obtained through the following steps:
1. a step in which the carbon fiber bundle is cut;
2. a step in which the cut carbon fibers are introduced into a tube, and air is blown to the fibers to open the fiber bundle; and
3. a step in which the opened carbon fibers are spread and simultaneously sucked, whereby the carbon fibers are dispersed, applied, and fixed.

It is preferable that the opening degree of the carbon fibers in a thermoplastic resin matrix is controlled, such that the resulting random mat contains specific proportions of carbon fibers in the form of a carbon fiber bundle of a specific number or more of carbon fibers and other opened carbon fibers. Use of the carbon fiber bundle of the invention makes it possible to suitably control the opening degree, and random mats suitable for various applications and purposes can be provided.

<Random Mat Containing Thermoplastic Resin>

A random mat can be formed from discontinuous carbon fibers obtained by cutting the carbon fiber bundle of the invention to a fiber length of 2 to 60 mm and a thermoplastic resin. That is, the invention encompasses a random mat including the carbon fiber bundle mentioned above provided with a fiber length of 2 to 60 mm and a thermoplastic resin, characterized in that the carbon fibers are substantially randomly oriented in the plane at an areal weight of 25 to 3,000 g/m$^2$.

It is preferable that thermoplastic resin is a polypropylene resin. A polypropylene resin includes, in addition to a propylene unit, copolymerization components such as ethylene, α-olefins other than propylene, cyclic olefins, unsaturated acids and derivatives thereof, and unsaturated acids and acid anhydrides thereof. Examples of such α-olefins include 1-butene, 1-pentene, 1-hexene, 1-heptene, 1-octene, 1-nonene, 1-decene, and 4-methyl-1-pentene. Examples of cyclic olefin monomers include cyclobutene, cyclopentene, cyclopentadiene, 4-methylcyclopentene, 4,4-dimethylcyclopentene, cyclohexene, 4-methylcyclohexene, 4,4-dimethylcyclohexene, 1,3-dimethylcyclohexene, 1,3-cyclohexadiene, 1,4-cyclohexadiene, cycloheptene, 1,3-cycloheptadiene, 1,3,5-cycloheptatriene, cyclooctene, 1,5-cyclooctadiene, and cyclododecene. In addition, examples of unsaturated acids include maleic acid, fumaric acid, acrylic acid, and methacrylic acid, and examples of unsaturated acid anhydrides include maleic anhydride. A copolymer thereof may be in the form of a random copolymer, a block copolymer, or a graft copolymer. In the case where a copolymerization component is contained, a preferred copolymerization molar ratio is 0.1 to 50%. In addition, the polypropylene resin may be blended with another resin and used. Examples of such resins include ethylene-propylene copolymer elastomers (EPR), ethylene-propylene-diene copolymer elastomers (EPDM), ethylene-butene-1 copolymer elastomers (EBM), ultra-low-density polyethylene, styrene-butadiene block copolymer elastomers, styrene-butadiene random copolymer elastomers, and styrene-isoprene block copolymer elastomers. It is also possible to blend an inorganic filler with the polypropylene resin. Examples of inorganic fillers include talc, calcium silicate, calcium silicate, wollastonite, montmorillonite, and various inorganic nanofillers. In addition, as necessary, other additives that are conventionally blended with a polyolefin composition may be blended with the polypropylene resin. Examples thereof include heat stabilizers, antistatic agents, weathering stabilizers, light stabilizer, age resistors, antioxidants, softeners, dispersants, fillers, colorants, and lubricants.

It is preferable that the amount of the thermoplastic resin present in the random mat is 10 to 500 parts by weight per 100 parts by weight of the carbon fibers, more preferably 20 to 250 parts by weight.

In the random mat, it is preferable that the thermoplastic resin is present in fibrous, powdery, or granular form.

The random mat is preferably obtained through the following steps:

1. a step in which the carbon fiber bundle is cut;
2. a step in which the cut carbon fibers are introduced into a tube, and air is blown to the fibers to open the fiber bundle;
3. an application step in which the opened carbon fibers are spread and simultaneously sucked together with a thermoplastic resin, whereby the carbon fibers and the thermoplastic resin are simultaneously dispersed; and
4. a step in which the applied carbon fibers and thermoplastic resin are fixed.

It is preferable that the opening degree of the carbon fibers in a thermoplastic resin matrix is controlled, such that the resulting random mat contains specific proportions of carbon fibers in the form of a carbon fiber bundle of a specific number or more of carbon fibers and other opened carbon fibers. Use of the carbon fiber bundle of the invention makes it possible to suitably control the opening degree, and random mats suitable for various applications and purposes can be provided.

<Composite Material Molded Plate>

By pressurizing the random mat containing a thermoplastic resin mentioned above at a temperature equal to or higher than the melting point of the thermoplastic resin, a carbon fiber random mat composite material molded plate can be obtained. The carbon fiber bundle of the invention has excellent adhesion to a thermoplastic resin. Therefore, molded materials having various excellent mechanical physical properties can be provided. In addition, use of the carbon fiber bundle of the invention makes it possible to suitably control the opening degree, and random mat composite material molded plates suitable for various applications and purposes can be provided.

<Uniaxially Oriented Carbon Fiber Composite Material>

By aligning the carbon fiber bundle mentioned above and bringing the same into contact with a molten thermoplastic resin to combine the carbon fiber bundle with the thermoplastic resin, a uniaxially oriented carbon fiber composite material can be obtained. It is preferable that the thermoplastic resin is a polypropylene resin. A uniaxially oriented member may be a laminate of a plurality of unidirectional members.

As preferred examples of polypropylene resins, those described in the section of Random Mat above are mentioned.

The method for producing a uniaxially oriented carbon fiber composite material layer is not particularly limited, and the layer can be obtained by a pultrusion method, for example. In the case where a pultrusion method is used, carbon fibers impregnated with a thermoplastic resin are advantageously obtained. In the case where impregnation with a thermoplastic resin is suppressed, i.e., in the case of a semi-impregnated layer, the layer is preferably obtained by a method in which carbon fibers are unidirectionally aligned on a thermoplastic resin sheet and heated while pressing as necessary, for example.

It is preferable that the composite material has a cylindrical or prismatic shape. When a strand is obtained by bonding the carbon fiber bundle with a thermoplastic resin and cut, long fiber pellets made of carbon fibers and a thermoplastic resin can be obtained.

In the case of a prismatic shape, it is also possible to reduce the height (thickness) to form a sheet shape. The preferred thickness of a sheet shape is 40 to 3,000 μm.

It is preferable that the amount of the thermoplastic resin present in the uniaxially oriented carbon fiber composite material is 10 to 500 parts by weight, more preferably 20 to 250 parts by weight, per 100 parts by weight of the carbon fibers.

<Composite Molded Part>

By combining the carbon fiber random mat composite material molded plate mentioned above and the uniaxially oriented carbon fiber composite material mentioned above, a carbon fiber composite molded part can be provided. That is, the invention also encompasses the carbon fiber composite molded part. It is preferable that the amount of the uniaxially oriented carbon fiber composite material is 5 to 100% relative to the total volume of the random mat composite material molded plate. However, the volume percent and area percent of the laminated portion and the position of lamination may be suitably selected according to various applications. It is preferable that the uniaxially oriented carbon fiber composite materials are placed such that the desired torsional rigidity and bending rigidity are effectively developed. It is also preferable that the uniaxially oriented carbon fiber composite material is placed such that two axes are formed at an angle within a range of 30 to 120°, for example.

Figure 2:
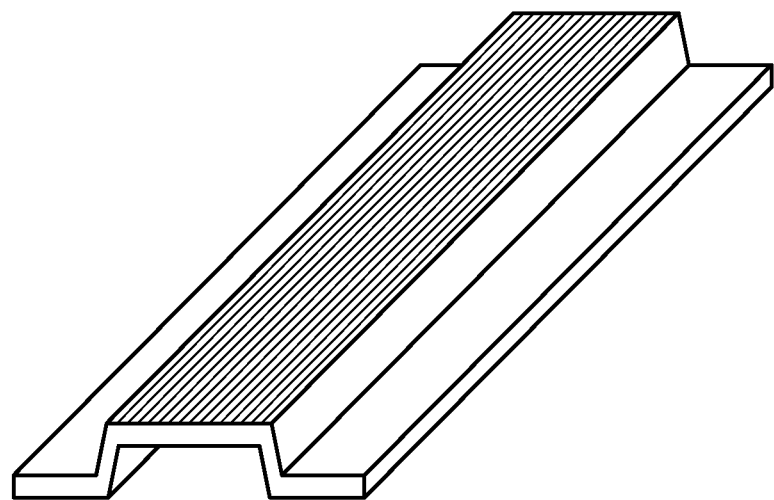
FIG. 2 shows an example of the structure of a composite molded part.
Figure 3:
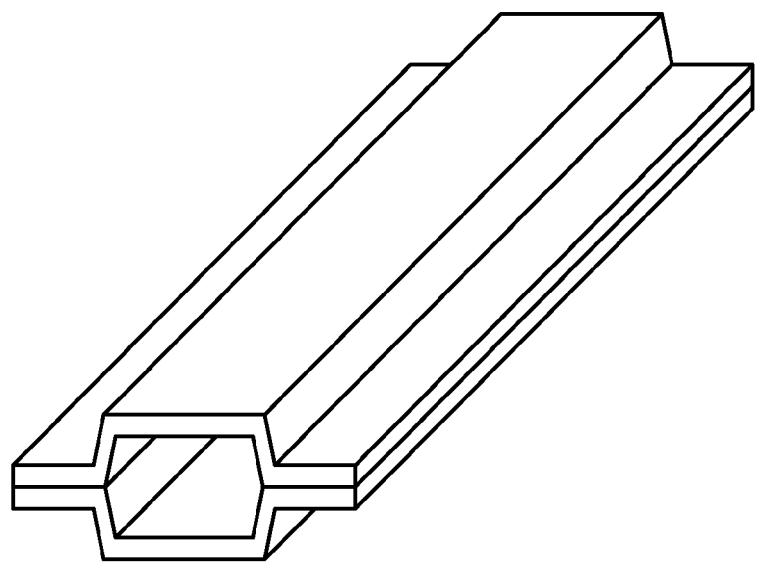
FIG. 3 shows an example of the structure of a composite molded part.

FIGS. 1 to 3 show structural examples of such composite molded bodies. FIG. 1 shows an example of a three-dimensional structure formed by laminating a random layer and a unidirectional member layer together, and FIG. 2 shows an example of a three-dimensional structure formed by laminating a unidirectional member layer on a part of a random layer. FIG. 3 shows an example of a prismatic shape formed of three-dimensional structures as shown in FIG. 2 plane-symmetrically attached together. This structure can be used to provide a preferred automotive side pillar, for example.

The proportions of the random layer and the unidirectional member layer laminated and their up-and-down relationship can be suitably selected according to the molded part to be obtained.

The thermoplastic resin forming the random mat composite material molded plate may be the same as or different from the thermoplastic resin forming the uniaxially oriented carbon fiber composite material. Preferred examples of specific methods for obtaining a fiber composite molded part include the following two methods. These methods make it possible to obtain a preferred composite molded part having a three-dimensional shape.

1) A method in which the carbon fiber random mat composite material molded plate and the uniaxially oriented carbon fiber composite material are laminated together, and the resulting plate-shaped article is press-molded.

2) A method in which the carbon fiber random mat composite material molded plate and the uniaxially oriented carbon fiber composite material are pressed together in a mold.

It is also possible to use a laminate of a plurality of random mat composite material molded plate layers and a laminate of a plurality of uniaxially oriented carbon fiber composite material layers. It is also preferable that the carbon fiber composite molded part is a sandwich material having a skin layer and a core layer. Examples of sandwich materials include a) a material having the carbon fiber random mat composite material molded plate as a skin layer and the uniaxially oriented carbon fiber composite material as a core material, b) a material having the carbon fiber random mat composite material molded plate as a core material and the uniaxially oriented carbon fiber composite material as a skin layer, and c) a material further having another layer.

<Floor Pan>

Figure 14:
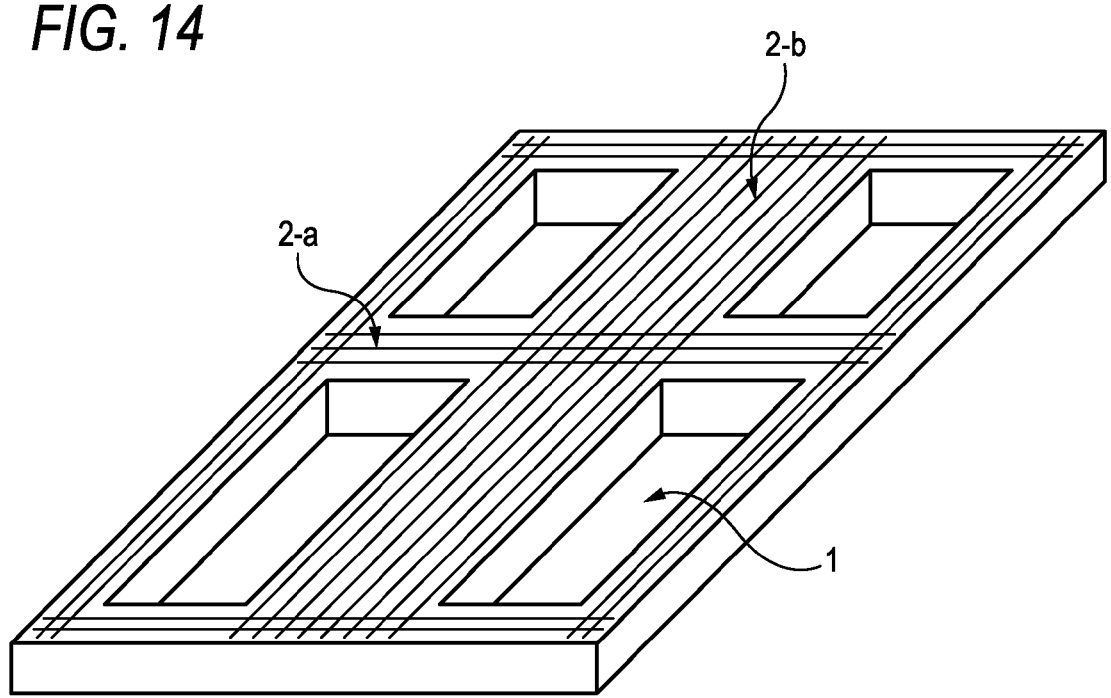
FIG. 14 shows an example of the structure of a composite molded part (an example of a floor pan).

A preferred automotive floor pan can be provided by using the carbon fiber random mat composite material molded plate for the entire surface thereof and also partially using the uniaxially oriented carbon fiber composite material as a cross member and/or a side member. A specific example thereof is shown in FIG. 14. As illustrated in the figure, uniaxially oriented members can be used at different angles.

EXAMPLES

Examples will be shown hereinafter. However, the invention is not limited thereto.

1) Method for Measuring Bending Physical Properties of Composite Material Molded Plate The bending test in the following examples is as follows. A specimen 15 mm in width×100 mm in length was cut from a molded plate, and evaluation was performed by a method in accordance with JIS K 7074, i.e., three-point bending by a central load. The specimen was placed on supports of r=2 mm separated by a distance of 80 mm, and a load was applied through an indenter of r=5 mm to the center between the supports at a test speed of 5 mm/min. The maximum load and the amount of central deflection were then measured to determine the bending strength and the bending elastic modulus.

2) Method for Measuring Physical Properties of Injection-Molded Specimen

The method for measuring the physical properties of an injection-molded specimen in the following examples is as follows.

(1) A dumbbell specimen was produced from obtained pellets using an injection molding machine, and the tensile strength and the tensile elongation were measured in accordance with ASTM D 638.

(2) A dumbbell specimen was produced from obtained pellets using an injection molding machine, and the bending strength and the bending elastic modulus were measured in accordance with ASTM D 790.

Example 1

280 parts by mass of a propylene-styrene copolymer (the molar ratio of styrene per 100 of propylene: 1), 25 parts by mass of maleic anhydride, 7 parts by mass of dicumyl peroxide, and 420 parts by mass of toluene were added to an autoclave provided with a stirrer. After nitrogen purge for about 5 minutes, the mixture was allowed to react at 140° C. for 5 hours with heating and stirring. After the completion of the reaction, the reaction liquid was placed in a large amount of methyl ethyl ketone to precipitate a crude copolymerized polyolefin. The crude copolymerized polyolefin was further washed with methyl ethyl ketone several times to remove unreacted maleic anhydride, and then dried under reduced pressure to give a solid copolymerized polyolefin. As a result of infrared absorption spectrum measurement, the copolymerization ratio of maleic anhydride was 0.7 per 100 of propylene in a molar ratio. In addition, as a result of high-temperature GPC measurement, the weight average molecular weight was 86,000.

Next, 400 parts by mass of toluene was added to 100 parts by mass of the copolymerized polyolefin, heated with stirring, and uniformly dissolved. Meanwhile, in a different container, parts by mass of a polyoxyethylene-alkyl-ether-based surfactant (manufactured by Kao Corporation, polyoxyethylene lauryl ether "EMULGEN® 103") was dissolved in 400 parts by mass of water. The toluene solution of the copolymerized polyolefin and the aqueous surfactant solution were placed in an emulsifier and stirred to give a pre-emulsion.

Morpholine was added to the pre-emulsion, and toluene and water were distilled off under reduced pressure using a rotary evaporator.

The finally obtained aqueous copolymerized polyolefin emulsion had an average particle size of 0.7 μm and a pH of 8.5, and the amount of water was 400 parts by mass per 100 parts by mass of polyolefin.

The obtained aqueous copolymerized polyolefin emulsion was adjusted such that the amount of water was 4,000 parts by mass per 100 parts by mass of the copolymerized polyolefin to give a copolymerized polyolefin emulsion. In the obtained copolymerized polyolefin emulsion, an unsized carbon fiber strand ("TENAX® STS-24K N00" manufactured by Toho Tenax; 7 μm in diameter×24,000 filaments, yield: 1.6 g/m, tensile strength: 4,000 MPa (408 kgf/mm$^2$), tensile elastic modulus: 238 GPa (24.3 ton/mm$^2$)) was continuously immersed, whereby the filaments were impregnated with the copolymerized polyolefin as a sizing agent.

Subsequently, the strand was passed through a dryer at 80° C. for 5 minutes to evaporate moisture, and then heat-treated in a dryer at 150° C. for 5 minutes. The obtained carbon fiber bundle was measured for the amount of the copolymerized polyolefin, i.e., a sizing agent, attached thereto. The result was 1.6 parts by mass per 100 parts by mass of the carbon fiber bundle.

A polypropylene film (a propylene film SC#30 manufactured by Tohcello) was placed between two of the obtained carbon fiber bundles in such a manner that the length of an adhesive portion was 25 mm, followed by adhesive at 230° C. Subsequently, tensile shear strength was measured by a method in accordance with JIS K 6850. That is, a tes piece was held by the upper and lower chucks of the tester at the positions 50 mm away from both ends of the adhesive portion, respectively, and thus symmetrically fixed to the tester, and the measurement was performed at a test speed of 3 mm/min. As a result, high shear strength was obtained as shown in Table 1.

Over chrome-plated stainless steel sticks having a diameter of 2 mm placed at an interval of 15 mm, the carbon fiber bundle was hung in a zigzag manner at a contact angle of 120° relative to the stainless steel sticks. The carbon fiber bundle was then unwound from a bobbin at a set tension of 0.204 N (200 gf) and thus abraded. The carbon fiber bundle after abrasion was placed between two urethane sponge sheets (dimension: 32 mm×64 mm×10 mm, mass: 0.25 g). A 125-g weight was placed thereon to apply a load to the entire urethane sponge, and the carbon fiber bundle was passed therethrough at a rate of 15 m/min for 2 minutes. The mass of the resulting fluff attached to the sponge was measured as the amount of fluff due to abrasion. As a result, as shown in Table 1, the amount of fluff due to abrasion was small.

Example 2

A solid copolymerized polyolefin was obtained by the same method as in Example 1, except that 280 parts by mass of a propylene-ethylene-styrene copolymer (the molar ratio of ethylene per 100 of propylene: 100, the molar ratio of styrene per 100 of propylene: 2), 70 parts by mass of maleic anhydride, 5.6 parts by mass of di-tert-butyl peroxide, and 420 parts by mass of toluene were used. As a result of infrared absorption spectrum measurement, the copolymerization ratio of maleic anhydride was 0.8 per 100 of propylene. In addition, as a result of high-temperature GPC measurement, the weight average molecular weight was 82,000. Then, a copolymerized polyolefin emulsion was prepared by the same method as in Example 1. A carbon fiber bundle was sized with the obtained copolymerized polyolefin emulsion, and the amount of the copolymerized polyolefin attached was measured. The result was 1.3 parts by mass per 100 parts by mass of the carbon fiber bundle.

The obtained carbon fiber bundle was measured for tensile shear strength in the same manner as in Example 1. As a result, high shear strength was obtained as shown in Table 1.

The obtained carbon fiber bundle was measured for the amount of fluff due to abrasion in the same manner as in Example 1. As a result, as shown in Table 1, the amount of fluff due to abrasion was small.

Example 3

A copolymerized polyolefin was obtained by the same method as in Example 2, except that in the propylene-ethylene-styrene copolymer, the molar ratio of the α-olefin was 150 per 100 of propylene. Then, a copolymerized polyolefin emulsion was prepared by the same method as in Example 1, and a carbon fiber bundle was sized therewith. Subsequently, the tensile shear strength of the carbon fiber bundle with a polypropylene film was measured.

The obtained carbon fiber bundle was measured for tensile shear strength in the same manner as in Example 1. As a result, high shear strength was obtained as shown in Table 1.

The obtained carbon fiber bundle was measured for the amount of fluff due to abrasion in the same manner as in Example 1. As a result, as shown in Table 1, the amount of fluff due to abrasion was small.

Example 4

A copolymerized polyolefin was obtained by the same method as in Example 2, except that in the propylene-ethylene-styrene copolymer, the molar ratio of the α-olefin was 200 per 100 of propylene. Then, a polyolefin emulsion was prepared by the same method as in Example 1, and a carbon fiber bundle was sized therewith. Subsequently, the tensile shear strength of the carbon fiber bundle with a polypropylene film was measured.

The obtained carbon fiber bundle was measured for tensile shear strength in the same manner as in Example 1. As a result, high shear strength was obtained as shown in Table 1.

The obtained carbon fiber bundle was measured for the amount of fluff due to abrasion in the same manner as in Example 1. As a result, as shown in Table 1, the amount of fluff due to abrasion was small.

Examples 5 to 7

A copolymerized polyolefin was obtained by the same method as in Example 2, except that the amount of the polyoxyethylene-alkyl-ether-based surfactant was changed to the composition shown in Table 1.

Then, a copolymerized polyolefin emulsion was prepared by the same method as in Example 1, and a carbon fiber bundle was sized therewith. Subsequently, the tensile shear strength of the carbon fiber bundle with a polypropylene film was measured.

The obtained carbon fiber bundle was measured for tensile shear strength in the same manner as in Example 1. As a result, high shear strength was obtained as shown in Table 1.

The obtained carbon fiber bundle was measured for the amount of fluff due to abrasion in the same manner as in Example 1. As a result, as shown in Table 1, the amount of fluff due to abrasion was small.

Example 8

A solid copolymerized polyolefin was obtained by the same method as in Example 1, except that 280 parts by mass of a propylene-1-butene-styrene copolymer (the molar ratio of the α-olefin per 100 of propylene: 30, the molar ratio of styrene per 100 of propylene: 1), 40 parts by mass of maleic anhydride, 5.6 parts by mass of di-tert-butyl peroxide, and 420 parts by mass of toluene were used. As a result of infrared absorption spectrum measurement, the copolymerization ratio of maleic anhydride was 1.1 per 100 of propylene in a molar ratio. In addition, as a result of high-temperature GPC measurement, the weight average molecular weight was 40,000. Then, a copolymerized polyolefin emulsion was prepared by the same method as in Example 1. A carbon fiber bundle was sized therewith, and the amount of the copolymerized polyolefin attached was measured. The result was 1.0 part by mass per 100 parts by mass of the carbon fiber bundle.

The obtained carbon fiber bundle was measured for tensile shear strength in the same manner as in Example 1. As a result, high shear strength was obtained as shown in Table 2.

The obtained carbon fiber bundle was measured for the amount of fluff due to abrasion in the same manner as in Example 1. As a result, as shown in Table 2, the amount of fluff due to abrasion was small.

Example 9

A copolymerized polyolefin was obtained by the same method as in Example 1, except that the amount of the polyoxyethylene-alkyl-ether-based surfactant was changed to the composition shown in Table 2. Then, a polyolefin emulsion was prepared by the same method as in Example 1, and a carbon fiber bundle was sized therewith. Subsequently, the tensile shear strength of the carbon fiber bundle with a polypropylene film was measured. In Example 9, the tensile shear strength was slightly poor, and the amount of fluff due to abrasion was slightly large. The results are shown in Table 2.

Example 10

A copolymerized polyolefin was obtained by the same method as in Example 1, except that 280 parts by mass of a propylene-methylstyrene copolymer (molar ratio of methylstyrene per 100 of propylene: 1) was used.

Then, a polyolefin emulsion was prepared by the same method as in Example 1, and a carbon fiber bundle was sized therewith. Subsequently, the tensile shear strength of the carbon fiber bundle with a polypropylene film was measured.

The obtained carbon fiber bundle was measured for tensile shear strength in the same manner as in Example 1. As a result, high shear strength was obtained as shown in Table 2.

The obtained carbon fiber bundle was measured for the amount of fluff due to abrasion in the same manner as in Example 1. As a result, as shown in Table 2, the amount of fluff due to abrasion was small.

Examples 11 and 12

A copolymerized polyolefin was obtained by the same method as in Example 1, except that the molar ratio of styrene to propylene was changed as shown in Table 2.

Then, a polyolefin emulsion was prepared by the same method as in Example 1, and a carbon fiber bundle was sized therewith. Subsequently, the tensile shear strength of the carbon fiber bundle with a polypropylene film was measured.

The obtained carbon fiber bundle was measured for tensile shear strength in the same manner as in Example 1. As a result, slightly high shear strength was obtained as shown in Table 2.

The obtained carbon fiber bundle was measured for the amount of fluff due to abrasion in the same manner as in Example 1. As a result, as shown in Table 2, the amount of fluff due to abrasion was small.

Example 13

Comparative Example 5

A copolymerized polyolefin was obtained by the same method as in Example 1 or Example 10, except that the molar ratio of methylstyrene as a copolymer component was changed to the composition shown in Table 3. Then, a polyolefin emulsion was prepared by the same method as in Example 1, and a carbon fiber bundle was sized therewith. The tensile shear strength of the carbon fiber bundle with a polypropylene film was then measured. In Example 13, the tensile shear strength was slightly poor, and the amount of fluff due to abrasion was slightly large. Also in Comparative Example 5, the tensile shear strength was slightly poor, and the amount of fluff due to abrasion was slightly large. The results are shown in Table 2.

Comparative Example 1

A maleic-anhydride-modified polyolefin was obtained by the same method as in Example 1, except that styrene as a copolymer component was excluded, and that 280 parts by mass of propylene was used. Then, a polyolefin emulsion was prepared by the same method as in Example 1, and a carbon fiber bundle was sized therewith. Subsequently, the tensile shear strength of the carbon fiber bundle with a polypropylene film was measured. In Comparative Example 1, only low tensile shear strength was obtained, and the amount of fluff due to abrasion was large. The results are shown in Table 3.

Comparative Example 2

A maleic-anhydride-modified polyolefin was obtained by the same method as in Example 1, except that styrene as a copolymer component was excluded, 280 parts by mass of propylene was used, and the polyoxyethylene-alkyl-ether-based surfactant was excluded. Then, a polyolefin emulsion was prepared by the same method as in Example 1, and a carbon fiber bundle was sized therewith. Subsequently, the tensile shear strength of the carbon fiber bundle with a polypropylene film was measured. In Comparative Example 2, only low tensile shear strength was obtained, and the amount of fluff due to abrasion was large. The results are shown in Table 3.

Comparative Example 3

To an autoclave provided with a stirrer were added 100 parts of pure water, 2 parts of sodium dodecylbenzenesulfonate, 8.2 parts of styrene, 1.5 parts of acrylonitrile, 1 part of β-hydroxyethyl acrylate, 1 part of itaconic acid, 1 part of t-dodecyl mercaptan, and 10 parts of cyclohexene. The mixture was thoroughly stirred, then 1 part of sodium persulfate was added, and polymerization was initiated at 75° C. In 1 hour after initiation, 40 parts of pure water, 2 parts of sodium dodecylbenzenesulfonate, 73.8 parts of styrene, 13.5 parts of acrylonitrile, and 1 part of acrylic acid were continuously added over 6 hours. The polymerization temperature of 75° C. was maintained for 5 hours, and then diethyl hydroxylamine was added as a polymerization terminator to terminate the polymerization. The resulting polymerization conversion was 97%. Next, the copolymer emulsion was adjusted to about pH 7 with an aqueous caustic soda solution. Subsequently, unreacted monomers and other low-boiling point compounds were removed by steam distillation to adjust the solid content to 45%, thereby giving a copolymer emulsion 1.

The amount of carboxyl groups detected in the copolymer emulsion 1 was 27 meq/100 g, and the number average particle size was 170 nm. A carbon fiber bundle was sized therewith, and the attached amount was then measured. The result was 1.2 parts by mass. The tensile shear strength of the carbon fiber bundle with a polypropylene film was measured. As a result, in Comparative Example 3, the tensile shear strength was 6.2 MPa, and only low tensile shear strength was obtained. The amount of fluff due to abrasion was also as large as 22.0 mg. Table 3 shows the copolymerization ratio between styrene and the ethylenic unsaturated carboxylic acid, as well as the results of Comparative Example 3.

Comparative Example 4

In an autoclave provided with a stirrer, 1 part by weight of sodium lauryl sulfate was added to 150 parts by weight of pure water with stirring, and the temperature in the reaction vessel was raised to 65° C. In addition, a liquid monomer mixture made of 40 parts by weight of styrene, 30 parts by weight of n-butyl acrylate, 20 parts by weight of N,N-dimethylaminoethyl acrylate, and 10 parts by weight of N,N-dimethylaminopropylacrylamide methyl chloride quaternary salt was prepared. A portion of the liquid monomer mixture was added before the initiation of the addition of a polymerization initiator. The mixture was thoroughly stirred in the reaction vessel, and then an aqueous potassium oleate solution of cumene hydroperoxide was continuously added dropwise over 3 hours to complete polymerization. In addition, the remaining liquid monomer mixture was continuously added dropwise over 2 hours from the initiation of the addition of an initiator. A copolymer emulsion was thus obtained. The resulting polymerization conversion was 98% or more, and the formation of a coagulum was hardly observed during polymerization. The emulsion was passed through a 100-mesh wire gauze. As a result, no residue was observed. A carbon fiber bundle was immersed to the prepared copolymer emulsion, a solid content of 40 wt % and dried at 150° C. for 30 minutes to remove moisture. The carbon fiber bundle was sized therewith, and the attached amount was then measured. The result was 1.4 parts by mass. The tensile shear strength of the carbon fiber bundle with a polypropylene film was measured. As a result, in Comparative Example 4, the tensile shear strength was 8.1 MPa, and only low tensile shear strength was obtained. The amount of fluff due to abrasion was also as large as 23.0 mg. Table 3 shows the copolymerization ratio between styrene and the ethylenic unsaturated carboxylic acid, as well as the results of Comparative Example 4.

Example 15

As a matrix resin, pellets of polypropylene "Prime Polypro® J108M" manufactured by Prime Polymer were cryomilled, and further classified through a 20-mesh and a 30-mesh to prepare a powder having an average particle size of about 1 mm. The carbon fiber bundle obtained in Example 1 cut to 16 mm and the polypropylene powder were introduced into a tapered tube. The amount of the carbon fibers fed and the amount of the polypropylene powder fed were set at 600 g/min and 465 g/min, respectively. While blowing air to the carbon fibers in the tapered tube to partially open the fiber bundle, the carbon fibers and the polypropylene powder were dispersed onto a table located under the exit of the tapered tube. The dispersed carbon fibers and polypropylene powder were sucked by a blower from below the table and thus fixed. A carbon fiber random mat having a thickness of about 5 mm was thus obtained. The obtained carbon fiber random mat was heated at 3 MPa for 5 minutes in a press mold heated to 240° C. to give a carbon fiber random mat composite material molded plate having an areal weight of 2,500 g/m², a thickness of 2.0 mm, and a fiber volume content of 40 vol %.

With respect to the bending physical properties of the obtained molded plate, the bending strength was 290 MPa and the bending elastic modulus was 25 GPa.

Example 16

On the top and bottom of a sheet formed by unidirectionally aligning the carbon fiber bundle obtained in Example 1, a polypropylene resin film (a 30-μ-thick film of polypropylene "Prime Polypro® J108M" manufactured by Prime Polymer) was placed such that the amount of the polypropylene resin was 100 parts by volume per 100 parts by volume of the carbon fibers. Using a heating roller at 240° C., a uniaxially oriented carbon fiber composite material sheet was obtained. The uniaxially oriented carbon fiber composite material sheet had a carbon fiber areal weight of 100 g/m² and a carbon fiber content of 50 vol %.

Eighteen of the uniaxially oriented carbon fiber composite material sheets were unidirectionally stacked and heated at 3.0 MPa for 5 minutes in a press mold heated to 240° C. to give a molded plate of t=2.0 mm.

With respect to the uniaxial bending physical properties of the obtained molded plate, the bending strength was 790 MPa and the bending elastic modulus was 102 GPa.

Example 17

The carbon fiber bundle obtained in Example 1 was unidirectionally aligned and pultrusion-molded with 150 parts by volume of a polypropylene resin ("Prime Polypro® J108M" manufactured by Prime Polymer) per 100 parts by volume of the carbon fibers to give a uniaxially oriented carbon fiber composite material molded plate having a width of 25 mm and a thickness of 0.1 mm.

Example 18

The carbon fiber random mat composite material molded plate of t=2 mm obtained in Example 15 was pre-heated to 220° C. in an IR oven and placed in a mold cavity having the cross-sectional shape shown in FIGS. 5A and 5B at a controlled mold temperature of 80° C. The molded plate was maintained under pressure for 30 seconds by cold pressing, and then a molded article having a thickness of 2.0 mm was removed. The molded article had no cracks or wrinkles in the material, and it was thus possible to obtain a non-defective carbon fiber composite material molded part.

Example 19

The carbon fiber random mat composite material molded plate of t=2 mm obtained in Example 15 was pre-heated to 220° C. in an IR oven and placed in a mold cavity having the cross-sectional shape with a local curvature of 1,500 mm shown in FIGS. 6A and 6B at a controlled mold temperature of 80° C. The molded plate was maintained under pressure for 30 seconds by cold pressing, and the resulting molded article having a thickness of 2.0 mm was removed. The molded article had no cracks or wrinkles in the material, and it was thus possible to obtain a non-defective carbon fiber composite material molded part.

Example 20

Figure 7A:
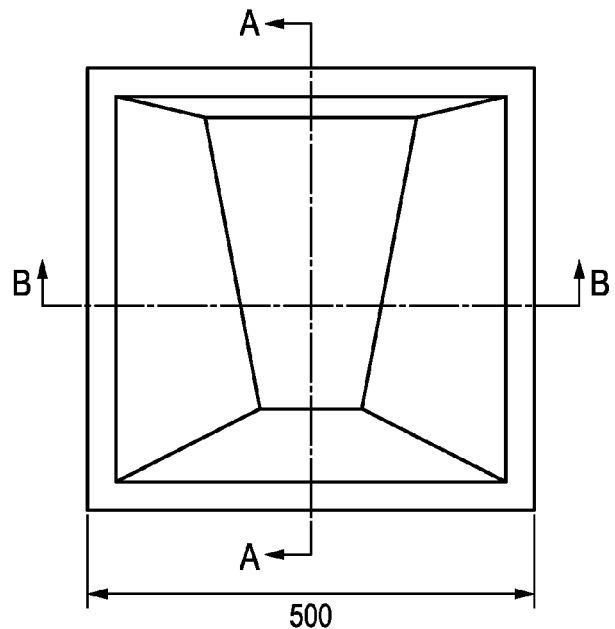
FIG. 7A shows a schematic diagram of a mold used in Example 20.
Figure 7B:
FIG. 7C shows a cross-section B-B in FIG. 7A.
Figure 7C:

The carbon fiber random mat composite material molded plate of t=2 mm obtained in Example 15 was pre-heated to 220° C. in an IR oven and placed in a mold cavity having the stepped shape of FIGS. 7A-7C at a controlled mold temperature of 80° C. The molded plate was maintained under pressure for 30 seconds by cold pressing, and the resulting molded article having a thickness of about 2 mm was removed. The molded article had no wrinkles in the standing walls or deep drawing portions of the product, and it was thus possible to obtain a non-defective carbon fiber composite material molded part.

Example 21

Figure 8B:
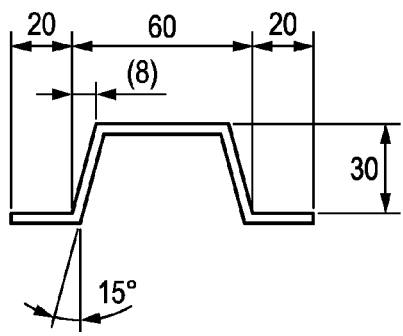
FIG. 8A shows a schematic diagram of a mold used in Example 21 and FIG. 8B shows a cross-section in FIG. 8B.
Figure 8A:
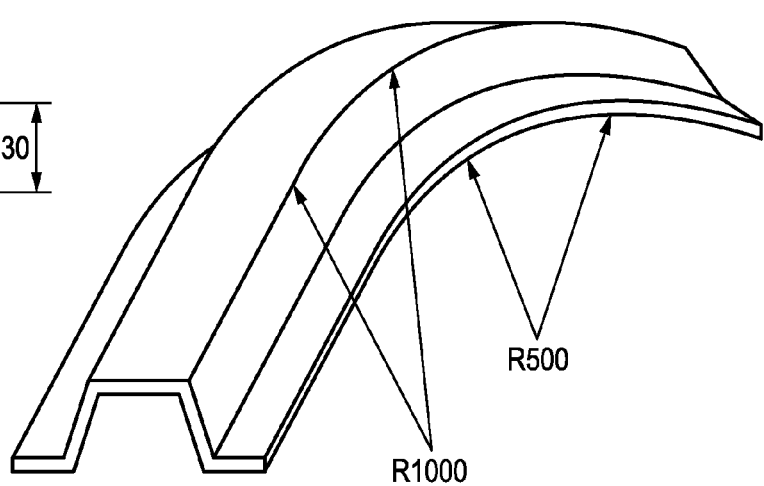

The carbon fiber random mat composite material molded plate of t=2 mm obtained in Example 15 was pre-heated to 220° C. in an IR oven and placed in a mold cavity having the shape with two curvatures shown in FIGS. 8A and 8B at a controlled mold temperature of 80° C. The molded plate was maintained under pressure for 30 seconds by cold pressing, and the resulting molded article having a thickness of about 2 mm was removed. The molded article had no wrinkles in the standing walls or deep drawing portions of the product, and it was thus possible to obtain a non-defective carbon fiber composite material molded part.

Example 22

Figure 4A:
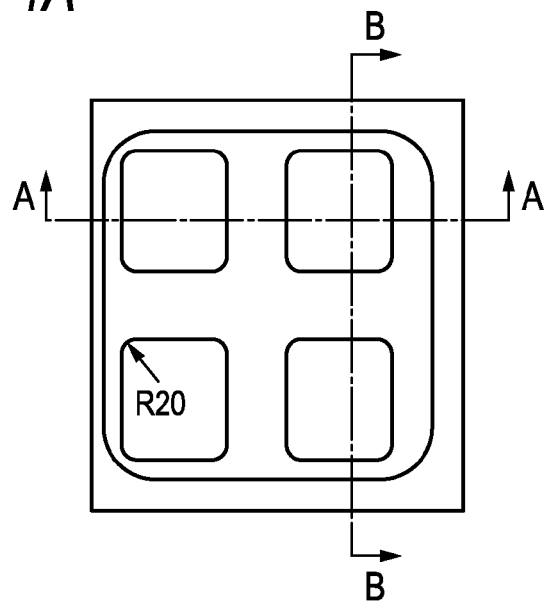
FIG. 4A shows a schematic diagram of a mold used in Examples 22 and 23.
Figure 4C:
FIG. 4C shows a cross-section B-B in FIG. 4A.
Figure 4B:
FIG. 4B shows a cross-section A-A in FIG. 4A.

The carbon fiber random mat having a thickness of about 5 mm obtained in Example 15 was placed in a mold cavity having the shape shown in FIGS. 4A-4C, and the temperature of the mold itself was raised to 230° C. Using a press, the mold was closed and maintained under pressure for 2 minutes. Subsequently, the mold was cooled down to a temperature of 80° C. using a cooling medium, and the resulting molded article having a thickness of 2.0 mm was removed. The molded article had no cracks or wrinkles in the material, and it was thus possible to obtain a non-defective carbon fiber composite material molded part.

Example 23

The carbon fiber random mat composite material molded plate obtained in Example 15 and the uniaxially oriented carbon fiber composite material sheet obtained in Example 16 were unidirectionally laminated together, and the resulting molded plate was pre-heated to 220° C. in an IR oven and placed in a mold cavity having the shape shown in FIGS. 4A-4C. The molded plate was maintained under pressure for 30 seconds by cold pressing, and the resulting molded article having a thickness of 2.0 mm was removed. The molded article had no wrinkles in the ceiling surface or standing walls, and it was thus possible to obtain a non-defective carbon fiber composite material molded part.

The molded article obtained in this example has the uniaxially oriented carbon fiber molded plate in a position where strength is required when used as an automotive floor pan, such as the ceiling portion or opposite standing walls.

Example 24

Figure 9A:
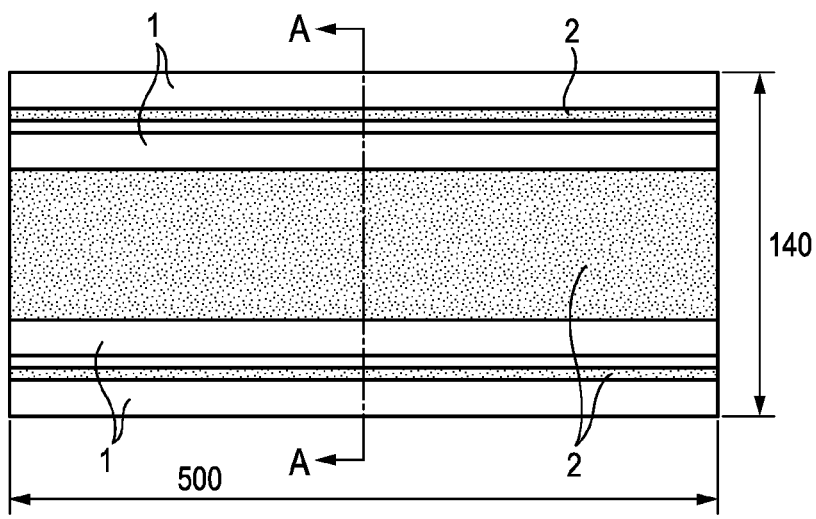
FIG. 9A shows a schematic diagram of a molded part obtained in Example 24 and FIG. 9B shows a cross-section A-A in FIG. 9A.
Figure 9B:
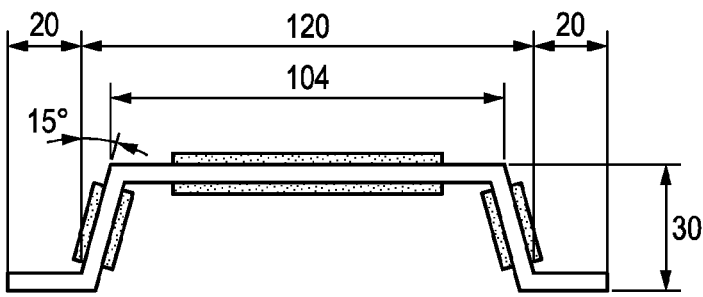

On one layer of the carbon fiber random mat composite material molded plate obtained in Example 15 cut to a size of 30 cm in width×50 cm in length, two layers each formed of six of the uniaxially oriented carbon fiber composite material molded plates obtained in Example 17 arranged in parallel were stacked. The stack was heated at 3 MPa for 3 minutes in a press mold heated to 240° C. to give a flat plate of t=2.2 mm. The obtained flat plate was heated to 240° C. using a heater and then molded by cold pressing into the shape shown in FIGS. 9A and 9B.

Two sets of such plates were plane-symmetrically attached together as shown in FIG. 3 to give a prism.

Example 25

Figure 10A:
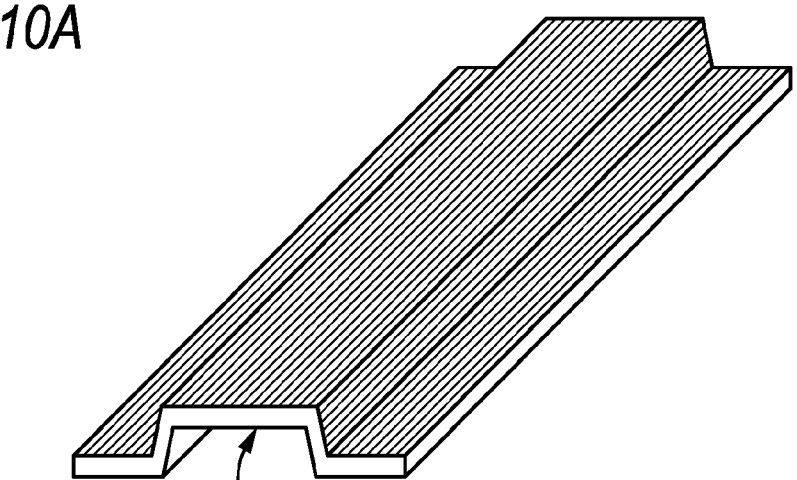
FIG. 10A shows a schematic diagram of a molded part obtained in Example 25 and FIG. 10B shows an enlarged view of a cross-section in FIG. 10B.
Figure 10B:
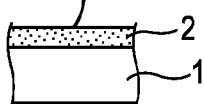

Two of the uniaxially oriented carbon fiber composite material molded plates obtained in Example 16 were laminated together in the center of a mold cavity, and one layer of the carbon fiber random mat composite material molded plate obtained in Example 15 cut to a size of 30 cm in width×50 cm in length was laminated thereon, followed by shaping. The laminate was heated at 3 MPa for 5 minutes in a press mold heated to 240° C. to form the shape shown in FIGS. 10A and 10B.

Two sets of such plates were plane-symmetrically attached together as shown in FIG. 3 to give a prism.

Example 26

A unidirectional member was formed from the uniaxially oriented carbon fiber composite material molded plate obtained in Example 17. On the top and bottom of a stack of eight layers each formed of six of the unidirectional members arranged in parallel, a carbon fiber random mat composite material molded plate cut to a size of 30 cm in width×50 cm in length was laminated by the same method as in Example 15, except that the molded plate had an areal weight of 600 g/m$^2$, a thickness of 0.5 mm, and a fiber volume content of 40 vol %. The laminate was heated at 3 MPa for 5 minutes in a press mold heated to 240° C. to give a sandwich plate of t=2.0 mm. The obtained sandwich plate was heated to 240° C. using a heater and then molded by cold pressing into the shape shown in FIGS. 11A and 11B. Two sets of such plates were plane-symmetrically attached together as shown in FIG. 3 to give a prism.

Example 27

On the top and bottom of a stack of eight layers of the uniaxially oriented carbon fiber composite material molded plates obtained in Example 16, a carbon fiber random mat composite material molded plate cut to a size of 30 cm in width×50 cm in length was laminated by the same method as in Example 15, except that the molded plate had an areal weight of 600 g/m$^2$, a thickness of 0.5 mm, and a fiber volume content of 40 vol %. The laminate was heated at 3 MPa for 3 minutes in a press mold heated to 240° C. to give a sandwich plate of t=2.0 mm.

Figure 11A:
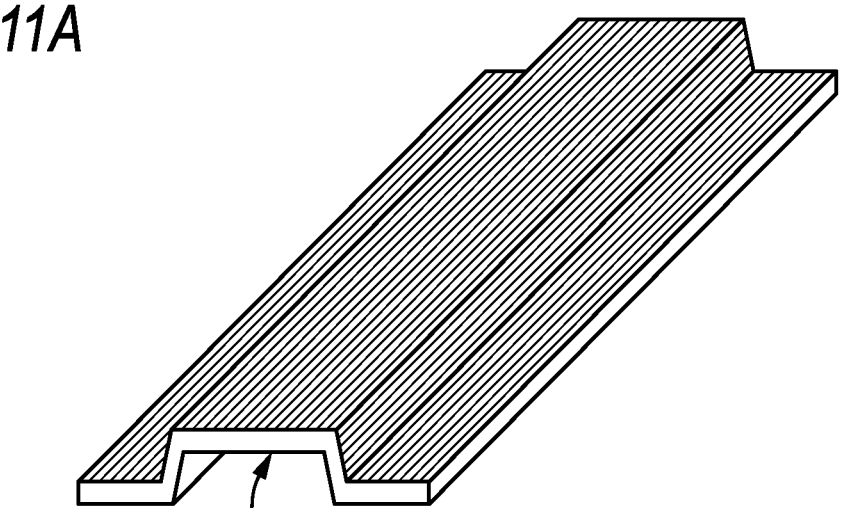
FIG. 11A shows a schematic diagram of a molded part obtained in Examples 26 and 27 and FIG. 11B shows an enlarged view of a cross-section of a ceiling portion in the molded part.
Figure 11B:
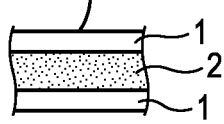

The obtained sandwich plate was heated to 240° C. using a heater and then molded by cold pressing into the shape shown in FIGS. 11A and 11B. Two sets of such plates were plane-symmetrically attached together as shown in FIG. 3 to give a prism.

Example 28

Figure 12A:
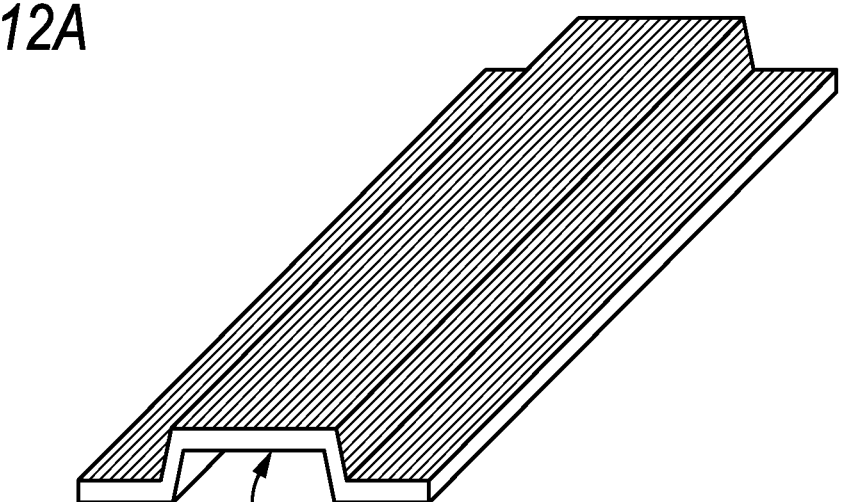
FIG. 12A shows a schematic diagram of a molded part obtained in Example 28 and FIG. 12B shows an enlarged view of a cross-sectional view of a ceiling portion in the molded part.
Figure 12B:
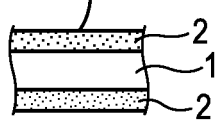

On the top and bottom of one layer of the carbon fiber random mat composite material molded plate obtained in Example 15 cut to a size of 30 cm in width×50 cm in length, the uniaxially oriented carbon fiber composite material molded plate obtained in Example 16 was laminated. The laminate was heated at 3 MPa for 5 minutes in a press mold heated to 240° C. to give a sandwich plate of t=2.0 mm. The obtained sandwich plate was heated to 240° C. using a heater and then molded by cold pressing into the shape shown in FIGS. 12A and 12B. Two sets of such plates were plane-symmetrically attached together as shown in FIG. 3 to give a prism.

Example 29

On the top and bottom of one layer of the carbon fiber random mat composite material molded plate obtained in Example 15 cut to a size of 30 cm in width×50 cm in length, six of the uniaxially oriented carbon fiber composite material molded plates obtained in Example 17 were arranged in parallel. The laminate was heated at 3 MPa for 3 minutes in a press mold heated to 240° C. to give a sandwich plate of t=2.0 mm.

Figure 13A:
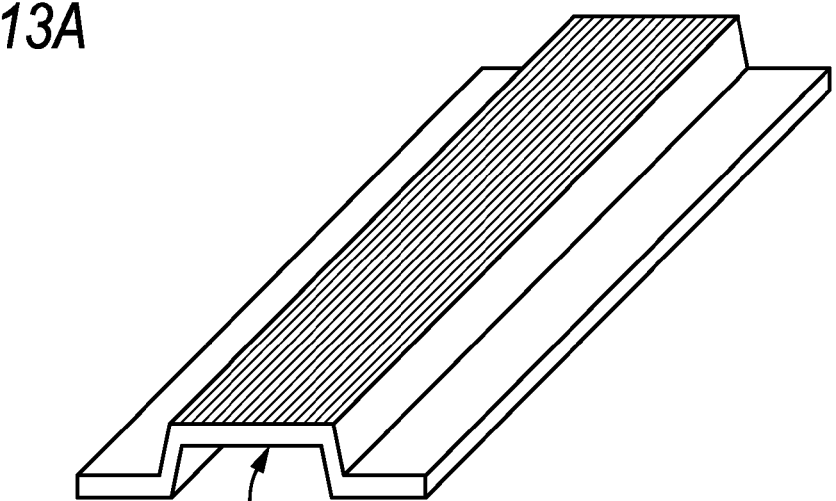
FIG. 13A shows a schematic diagram of a molded part obtained in Example 29 and FIG. 13B shows an enlarged view of a cross-sectional view of a ceiling portion in the molded part.
Figure 13B:
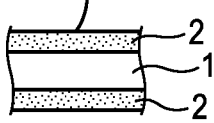

The obtained sandwich plate was heated to 240° C. using a heater and then molded by cold pressing into the shape shown in FIGS. 13A and 13B. Two sets of such plates were plane-symmetrically attached together as shown in FIG. 3 to give a prism.

Example 30

A bobbin having wound thereon the carbon fiber bundle obtained in Example 8 was mounted on a creel and drawn into a crosshead die fixed to the end of an extruder. While melting polypropylene resin pellets (Prime Polypro® J108M manufactured by Prime Polymer), the resin pellets and the carbon fiber bundle were drawn out together. A strand made of the carbon fiber bundle bonded with polypropylene was thus obtained. The obtained strand was cut with a pelletizer to give long fiber pellets of the carbon fibers.

The fiber content by weight was determined as follows. The pellets were placed in an oven at 500° C. for 2 hours to remove the resin component, and the content was determined from the resulting weight change.

Impregnation degree was calculated using the following equation.

Impregnation degree (wt %)=100−Wdf/(Wp×Wf)

In the equation, Wdf is the weight of dry fibers in the long fiber pellets, Wp is the weight of the long fiber pellets, and Wf is the carbon fiber content by weight. With respect to the weight of dry fibers, the pellets were broken, and carbon fibers not impregnated with the resin were separated and measured for weight.

A dumbbell specimen was produced from the obtained pellets using an injection molding machine, and the tensile strength and the tensile elongation were measured in accordance with ASTM D 638.

A dumbbell specimen was produced from the obtained pellets using an injection molding machine, and the bending strength and the bending elastic modulus were measured in accordance with ASTM D 790.

The obtained physical property data are shown in Table 4.

Example 31

Pellets were obtained under the same conditions as in Example 30, except that pellets of Prime Polypro® J108M manufactured by Prime Polymer and maleic-anhydride-modified polypropylene (Umex® 1010 manufactured by Sanyo Chemical Industries) mixed in a rotary blender in proportions of 98 wt % and 2 wt %, respectively, were used as polypropylene resin pellets. The obtained physical property data are shown in Table 4.

Example 32

Pellets were obtained under the same conditions as in Example 30, except that the carbon fiber bundle obtained in Example 1 was used. The obtained physical property data are shown in Table 4.

Example 33

Pellets were obtained under the same conditions as in Example 32, except that pellets of Prime Polypro® J108M manufactured by Prime Polymer and Umex® 1010 manufactured by Sanyo Chemical Industries mixed in a rotary blender in proportions of 98 wt % and 2 wt %, respectively, were used as polypropylene resin pellets. The obtained physical property data are shown in Table 4.

EXPLANATION OF REFERENCE NUMERALS

1. Random layer
2. Unidirectional member layer
2-*a*. Unidirectional member layer) (0°)
2-*b*. Unidirectional member layer) (90°)

TABLE 1

|  |  | Example 1 | Example 2 | Example 3 | Example 4 | Example 5 | Example 6 | Example 7 |
|---|---|---|---|---|---|---|---|---|
| Copolymerized Polyolefin | Polypropylene Containing Aromatic Vinyl Compound and Acid and/or Acid Anhydride as Copolymerization Components | 100 | — | — | — | — | — | — |
|  | Propylene-Ethylene Copolymer Containing Aromatic Vinyl Compound and Acid and/or Acid Anhydride as Copolymerization Components | — | 100 | 100 | 100 | 100 | 100 | 100 |
|  | Propylene-1-Butene Copolymer Containing Aromatic Vinyl Compound and Acid and/or Acid Anhydride as Copolymerization Components | — | — | — | — | — | — | — |
|  | Copolymerization Ratio between Propylene and Styrene *1 | 100:1 | 100:2 | 100:2 | 100:2 | 100:2 | 100:2 | 100:2 |

TABLE 1-continued

|  |  | Example 1 | Example 2 | Example 3 | Example 4 | Example 5 | Example 6 | Example 7 |
|---|---|---|---|---|---|---|---|---|
|  | Copolymerization Ratio between Propylene and Methylstyrene *1 | — | — | — | — | — | — | — |
|  | Copolymerization Ratio of Propylene-α-Olefin Copolymer *2 | — | 100:100 | 100:150 | 100:200 | 100:100 | 100:100 | 100:100 |
|  | The Number of Carbon Atoms in α-Olefin in Propylene-α-Olefin Copolymer | — | 2 | 2 | 2 | 2 | 2 | 2 |
| Surfactant | Polyoxyethylene-Alkyl-Ether-Based Surfactant | 8 | 8 | 8 | 8 | — | 4 | 16 |
| Amount of Polyolefin Attached [part by mass] |  | 1.6 | 1.3 | 1.5 | 1.4 | 1.7 | 1.6 | 1.7 |
| Tensile Shear Strength [MPa] |  | 20.0 | 20.4 | 19.6 | 18.5 | 16.8 | 19.8 | 18.8 |
| Amount of Fluff due to Abrasion [mg] |  | 7.1 | 8.0 | 8.5 | 8.1 | 8.6 | 9.1 | 7.9 |

*1 The molar ratio of aromatic vinyl compound per 100 of propylene
*2 The molar ratio of α-olefin per 100 of propylene

TABLE 2

|  |  | Example 8 | Example 9 | Example 10 | Example 11 | Example 12 | Example 13 | Comprative Example 5 |
|---|---|---|---|---|---|---|---|---|
| Copolymerized Polyolefin | Polypropylene Containing Aromatic Vinyl Compound and Acid and/or Acid Anhydride as Copolymerization Components | — | 100 | 100 | 100 | 100 | 100 | 100 |
|  | Propylene-Ethylene Copolymer Containing Aromatic Vinyl Compound and Acid and/or Acid Anhydride as Copolymerization Components | — | — | — | — | — | — | — |
|  | Propylene-1-Butene Copolymer Containing Aromatic Vinyl Compound and Acid and/or Acid Anhydride as Copolymerization Components | 100 | — | — | — | — | — | — |
|  | Copolymerization Ratio between Propylene and Styrene *1 | 100:1 | 100:1 | — | 100:5 | 100:10 | — | — |
|  | Copolymerization Ratio between Propylene and Methylstyrene *1 | — | — | 100:1 | — | — | 100:0.01 | 100:30 |
|  | Copolymerization Ratio of Propylene-α-Olefin Copolymer *2 | 100:30 | — | — | — | — | — | — |
|  | The Number of Carbon Atoms in α-Olefin in Propylene-α-Olefin Copolymer | 4 | — | — | — | — | — | — |
| Surfactant | Polyoxyethylene-Alkyl-Ether-Based Surfactant | 8 | 60 | 8 | 8 | 8 | 8 | 8 |
| Amount of Polyolefin Attached [part by mass] |  | 1.0 | 1.4 | 1.3 | 1.5 | 1.6 | 1.5 | 1.0 |
| Tensile Shear Strength [MPa] |  | 22.0 | 15.7 | 16.0 | 21.0 | 12.5 | 10.8 | 11.1 |
| Amount of Fluff due to Abrasion [mg] |  | 8.2 | 14.5 | 11.0 | 7.8 | 8.0 | 17.3 | 19.2 |

*1 The molar ratio of aromatic vinyl compound per 100 of propylene
*2 The molar ratio of α-olefin per 100 of propylene

TABLE 3

|  |  | Comparative Example 1 | Comparative Example 2 | Comparative Example 3 | Comparative Example 4 |
|---|---|---|---|---|---|
| Copolymerized Polyolefin | Polypropylene Containing Aromatic Vinyl Compound and Acid and/or Acid Anhydride as Copolymerization Components | 100 | 100 | — | — |
|  | Propylene-Ethylene Copolymer Containing Aromatic Vinyl Compound and Acid and/or Acid Anhydride as Copolymerization Components | — | — | — | — |
|  | Propylene-1-Butene Copolymer Containing Aromatic Vinyl Compound and Acid and/or Acid Anhydride as Copolymerization Components | — | — | — | — |

TABLE 3-continued

|  |  | Comparative Example 1 | Comparative Example 2 | Comparative Example 3 | Comparative Example 4 |
|---|---|---|---|---|---|
|  | Ethylene Copolymer Containing Aromatic Vinyl Compound and Acid and/or Acid Anhydride as Copolymerization Components | — | — | 100 | 100 |
|  | Copolymerization Ratio between Propylene and Styrene *1 | 100:0 | 100:0 | — | — |
|  | Copolymerization Ratio between Propylene and Methylstyrene *1 | — | — | — | — |
|  | Copolymerization Ratio of Propylene-α-Olefin Copolymer *2 | — | — | — | — |
|  | The Number of Carbon Atoms in α-Olefin in Propylene-α-Olefin Copolymer | — | — | — | — |
|  | Copolymerization Ratio between Ethylene and Styrene *3 | — | — | 100:560 | 100:100 |
| Surfactant | Polyoxyethylene-Alkyl-Ether-Based Surfactant | 8 | — | — | — |
|  | Amount of Polyolefin Attached [part by mass] | 1.4 | 1.5 | 1.2 | 1.4 |
|  | Tensile Shear Strength [MPa] | 9.2 | 6.4 | 6.2 | 8.1 |
|  | Amount of Fluff due to Abrasion [mg] | 21.5 | 39.2 | 22.0 | 23.0 |

*1 The molar ratio of aromatic vinyl compound per 100 of propylene
*2 The molar ratio of α-olefin per 100 of propylene
*3 The molar ratio of aromatic vinyl compound per 100 of ethylene

TABLE 4

|  |  | Example 30 | Example 31 | Example 32 | Example 33 |
|---|---|---|---|---|---|
| Carbon Fiber Bundle |  | Example 8 | Example 8 | Example 1 | Example 1 |
| Polypropylene (1) | % | 100 | 98 | 100 | 98 |
| Polypropylene (2) | % | 0 | 2 | 0 | 2 |
| Impregnation Degree | % | 99 | 99 | 98 | 98 |
| Carbon Fiber Content Wf | % | 25.2 | 24.4 | 25.5 | 24.4 |
| Tensile Strength | MPa | 131 | 103 | 107 | 103 |
| Tensile Elongation | % | 1.1 | 1.0 | 1.0 | 1.0 |
| Bending Elastic Modulus | GPa | 13.3 | 12.6 | 12.7 | 12.6 |
| Bending Strength | MPa | 217 | 184 | 198 | 184 |

STS40: STS40-24K manufactured by Toho Tenax
Polypropylene (1): Prime Polypro J108M manufactured by Prime Polymer
Polypropylene (2): Umex 1010 manufactured by Sanyo Chemical Industries

The invention claimed is:

1. A carbon fiber bundle comprising carbon fibers and a copolymerized polyolefin attached to a surface of the carbon fibers, the copolymerized polyolefin containing an aromatic vinyl compound and an acid, an acid anhydride, or a combination thereof as copolymerization components, the copolymerized polyolefin being obtainable by a graft copolymerization of (i) a member selected from the group consisting of propylene-aromatic vinyl compound copolymers, propylene-α-olefin-aromatic vinyl compound copolymers, and a combination thereof, with (ii) a member selected from the group consisting of unsaturated dicarboxylic acids, acid anhydrides thereof, and a combination thereof, a copolymerization ratio between the olefin and the aromatic vinyl compound in the copolymerized polyolefin being such that a molar ratio of the aromatic vinyl compound is 0.1 to 5 per 100 of the olefin, an amount of the copolymerized polyolefin attached being 0.01 to 10 parts by mass per 100 parts by mass of the carbon fiber bundle.

2. The carbon fiber bundle according to claim 1, wherein the aromatic vinyl compound is represented by the following general formula (1):

$$ArCH=CH_2 \qquad (1)$$

wherein Ar is a $C_{6-15}$ aromatic group.

3. The carbon fiber bundle according to claim 1, wherein a copolymerization ratio between the olefin and the acid, acid anhydride, or combination thereof in the copolymerized polyolefin is such that a molar ratio of the acid, acid anhydride, or combination thereof is 0.01 to 5 per 100 of the olefin.

4. The carbon fiber bundle according to claim 1, wherein the copolymerized polyolefin containing an aromatic vinyl compound and acid, acid anhydride, or combination thereof as copolymerization components has a weight average molecular weight of 35,000 to 100,000.

5. A random mat comprising the carbon fiber bundle of claim 1, wherein the carbon fiber bundles are randomly oriented in a plane of the random mat.

6. The random mat according to claim 5, wherein the carbon fibers have a carbon fiber length of 2 to 60 mm, and the random mat is a weight of 25 to 3,000 g/m².

7. The random mat according to claim 5, wherein the random mat comprises the carbon fiber bundle and a thermoplastic resin.

8. The random mat according to claim 7, wherein the thermoplastic resin is a polypropylene resin.

9. The random mat according to claim 7, wherein an amount of the thermoplastic resin present in the random mat is 50 to 1,000 parts by weight per 100 parts by weight of the carbon fibers.

10. The random mat according to claim 7, wherein the thermoplastic resin is present in fibrous, powdery, or granular form.

11. A method for producing a random mat, comprising the following steps:
(1) a step in which a carbon fiber bundle is cut;
(2) a step in which the cut carbon fiber bundle is introduced into a tube, and air is blown to the carbon fiber bundle to open the carbon fiber bundle; and (3) a step in which carbon fiber bundles opened in the step (2) are spread and simultaneously sucked, whereby the carbon fibers are dispersed, applied, and fixed, wherein the carbon fiber bundle comprises carbon fibers and a copolymerized polyolefin attached to a surface of the carbon fibers, the copolymerized polyolefin containing an aromatic vinyl compound and an acid, an acid anhydride, or a combination thereof as copolymerization components, the copolymerized polyolefin being obtainable by a graft copolymerization of (i) a member selected from the group consisting of propylene-aromatic vinyl compound copolymers, propylene-α-olefin-aromatic vinyl compound copolymers, and a combination thereof, with (ii) a member selected from the group consisting of unsaturated dicarboxylic acids, acid anhydrides thereof, and a combination thereof, a copolymerization ratio between the olefin and the aromatic vinyl compound in the copolymerized polyolefin being such that a molar ratio of the aromatic vinyl compound is 0.1 to 5 per 100 of the olefin, an amount of the copolymerized polyolefin attached being 0.01 to 10 parts by mass per 100 parts by mass of the carbon fiber bundle, and wherein the carbon fiber bundles are randomly oriented in a plane of the random mat.

12. A carbon fiber composite material comprises the carbon fiber bundle of claim 1 and a thermoplastic resin.

13. The carbon fiber composite material according to claim 12, wherein the carbon fibers are randomly oriented a plane of the random mat.

14. The carbon fiber composite material according to claim 12, wherein the carbon fiber bundle is aligning in the thermoplastic resin.

15. The carbon fiber composite material according to claim 12, wherein the carbon fiber composite material comprising a carbon fiber random mat and an uniaxially oriented carbon fiber composite material.

16. The carbon fiber composite material according to claim 12, having a three-dimensional shape and obtainable by press-molding a plate-shaped article.

17. The carbon fiber composite material according to claim 15, comprising the carbon fiber random mat as a skin layer and the uniaxially oriented carbon fiber composite material as a core material.

18. The carbon fiber composite material according to claim 15, comprising the carbon fiber random mat as a core material and the uniaxially oriented carbon fiber composite material as a skin layer.

19. An automotive floor pan comprises the carbon fiber bundle of claim 1 and a thermoplastic resin.

20. The automotive floor pan according to claim 19, comprising a carbon fiber random mat as a substrate and an uniaxially oriented carbon fiber composite material of as a part of the automotive floor pan.

* * * * *